(12) United States Patent
Zhou et al.

(10) Patent No.: US 7,903,701 B2
(45) Date of Patent: Mar. 8, 2011

(54) INTRACAVITY HARMONIC GENERATION USING A RECYCLED INTERMEDIATE HARMONIC

(75) Inventors: Fuzheng Zhou, Santa Clara, CA (US); Jufen Hua, legal representative, Santa Clara, CA (US); Haiwen Wang, Mountain View, CA (US); Chung-Po Huang, San Jose, CA (US)

(73) Assignee: Electro Scientific Industries, Inc., Portland, OR (US)

( * ) Notice: Subject to any disclaimer, the term of this patent is extended or adjusted under 35 U.S.C. 154(b) by 40 days.

(21) Appl. No.: 12/413,246

(22) Filed: Mar. 27, 2009

(65) Prior Publication Data

US 2010/0246615 A1 Sep. 30, 2010

(51) Int. Cl.
*H01S 3/10* (2006.01)

(52) U.S. Cl. ............ 372/22; 372/21; 359/326; 359/328; 359/329

(58) Field of Classification Search .................... 372/21, 372/22
See application file for complete search history.

(56) References Cited

U.S. PATENT DOCUMENTS

| | | | |
|---|---|---|---|
| 5,007,059 A * | 4/1991 | Keller et al. .................... | 372/18 |
| 5,025,446 A * | 6/1991 | Kuizenga ........................ | 372/21 |
| 5,206,868 A | 4/1993 | Deacon | |
| 5,278,852 A | 1/1994 | Wu et al. | |
| 5,633,883 A | 5/1997 | Shi et al. | |
| 5,943,351 A | 8/1999 | Zhou et al. | |
| 6,002,695 A | 12/1999 | Alfrey et al. | |
| 7,016,389 B2 | 3/2006 | Dudley et al. | |
| 7,027,209 B2 | 4/2006 | Zanger et al. | |
| 7,130,321 B2 * | 10/2006 | Spinelli et al. .................. | 372/22 |
| 7,180,928 B2 | 2/2007 | Caprara et al. | |
| 7,254,147 B2 | 8/2007 | Ukita et al. | |
| 7,471,704 B2 | 12/2008 | Ukita et al. | |
| 7,471,708 B2 | 12/2008 | Besaucéle et al. | |
| 2003/0035448 A1 * | 2/2003 | Yin ................................. | 372/22 |

OTHER PUBLICATIONS

International Searching Authority, International Patent Application No. PCT/US2010/027711, International Search Report and Written Opinion, Nov. 26, 2010, 9 pages.

* cited by examiner

*Primary Examiner* — Tod T Van Roy
(74) *Attorney, Agent, or Firm* — Stoel Rives LLP

(57) ABSTRACT

Lasers configured for intracavity harmonic generation of second and higher order harmonic laser beam energy include mode-matching optics, such as a curved mirror, for recycling an unused portion of an intermediate harmonic laser beam energy (e.g., second harmonic laser beam energy) to improve higher order harmonic laser beam energy generation efficiency (e.g., third or higher order harmonic laser beam energy generation efficiency) without sacrificing beam quality of the higher order harmonic laser beam energy. The curved mirror may be positioned out of a resonant laser cavity of the laser. A radius of curvature and a position of the curved mirror are selected so that a beam radius and a beam divergence of the recycled second harmonic laser beam energy are essentially the same as a beam radius and a beam divergence of incoming second harmonic laser beam energy everywhere along a beam path of the incoming second harmonic laser beam.

25 Claims, 11 Drawing Sheets

INTRACAVITY HARMONIC GENERATION USING A RECYCLED INTERMEDIATE HARMONIC

TECHNICAL FIELD

This disclosure relates to harmonic lasers, and more particularly, to efficient intracavity harmonic generation.

BACKGROUND INFORMATION

Laser systems are employed in a variety of applications including communications, medicine, and micromachining. These applications utilize a variety of laser wavelengths and output powers. In particular, high power laser beams having an ultraviolet (UV) wavelengths are widely used. Currently, there is no commercially available gain medium that directly generates UV laser beams. Thus, UV laser beams are typically generated through nonlinear processes, such as harmonic generation.

Two such harmonic generation configurations include an extracavity harmonic generation configuration and an intracavity harmonic generation configuration. The extracavity configuration generates harmonics outside of a resonant laser cavity. In other words, a laser beam is generated in a resonant laser cavity and directed to a crystal positioned external to the cavity. The intracavity configuration generates harmonics inside of a resonant laser cavity, which is generally more efficient than an extracavity configuration.

Generating a laser beam that is a third or higher harmonic of a fundamental frequency entails generating first a laser beam that is a second harmonic of the fundamental frequency. The extracavity and intracavity configurations generally do not convert all of the second harmonic beam to a third or higher order harmonic beam. Thus, the unused portion of the second harmonic beam reduces the overall efficiency of the laser system and reduces the power of the resultant third or higher order harmonic beam.

FIG. 1 is a schematic diagram of a known intracavity configuration for generating a third harmonic laser beam. A laser 100 employs a laser medium 102 positioned along an optical path 104 of a laser cavity 106 formed by end mirrors 108 and 110, optical pumping input couplers 112 and 114, and an output coupler 116. Laser 100 is pumped with two laser diode pumps 118 and 120. An optical fiber 122 directs laser radiation generated by laser diode pump 118 into laser cavity 106 through optical pumping input coupler 114. Likewise, an optical fiber 124 directs laser radiation generated by laser diode pump 120 into laser cavity 106 through optical pumping input coupler 112. A Q-switch 126, such as an acousto-optic Q-switch (AO-QS), is positioned along optical path 104 and is driven at an appropriate pulse repetition rate (PRR) to obtain short energetic pulses from laser 100. As a laser beam 130 having a fundamental wavelength resonates within cavity 106 between end mirrors 108 and 110, laser medium 102 amplifies laser beam 130.

A second harmonic generation (SHG) crystal 140 is positioned along optical path 104. As laser beam 130 passes through SHG crystal 140, SHG crystal 140 generates a second harmonic laser beam 142 having half the wavelength of laser beam 130. As laser beam 130 and second harmonic laser beam 142 pass through a third harmonic generation (THG) crystal 150, which is also positioned along optical path 104, THG crystal 150 generates a third harmonic laser beam 152 having one-third the wavelength of laser beam 130. Although second harmonic laser beam 142 reflects off end mirror 110, a portion of second harmonic laser beam 142 that is not used in generating third harmonic laser beam 152 exits cavity 106 as an unused, wasted second harmonic laser beam 144 via output coupler 116. Wasting unused second harmonic laser beam 144 lowers the conversion efficiency from the fundamental harmonic to the third harmonic and lowers the total power of third harmonic laser beam 152 that might otherwise be obtained. Third harmonic laser beam 152, which has the desired wavelength (e.g., a UV wavelength of 355 nm), exits cavity 106 as an output laser beam 154 via output coupler 116. Thus, output coupler 116 is highly reflective for laser beam 130 and antireflective for second harmonic laser beam 142 and third harmonic laser beam 152. Laser beams 130, 142 and 152 are shown axially offset from one another for illustration purposes.

U.S. Pat. No. 5,943,351 of Zhou et al. describes one attempt to improve the efficiency of generating a third or higher harmonic beam from a second harmonic beam. As shown in FIG. 2, a laser 200 includes a cavity having a first mirror 210, a lasing rod 220, an acousto-optic Q-switch 222, a second mirror 250, a SHG crystal 230, a third mirror 252, a THG crystal 232, and a fourth mirror 254. A main cavity is formed by mirrors 210 and 254, which cause oscillation of a fundamental beam 212 at 1064 nm using a Nd:YAG rod 220. Mirrors 250 and 254 form a first sub-cavity for the intracavity second harmonic generation (i.e., 532 nm) to create a second harmonic beam 214 therein, and mirrors 252 and 254 form a second sub-cavity for the third harmonic generation (i.e., 355 nm) to create a third harmonic beam 216.

Use of mirror 250 results in a significantly deteriorated third or higher order harmonic beam quality because a beam mode of second harmonic beam 214 is different each time second harmonic beam 214 passes through THG crystal 232. For example, after second harmonic beam 214 is generated by SHG crystal 230, second harmonic beam 214 converges as it propagates from SHG crystal 230 toward mirror 254 (assuming fourth mirror 254 is coincident with a beam waist). As second harmonic beam 214 passes through THG crystal 232, a portion of second harmonic beam 214 will be used to generate third harmonic beam 216 and a portion of second harmonic beam 214 will remain unused. After the unused portion of second harmonic beam 214 reflects off mirror 254, the unused portion of second harmonic beam 214 diverges as it propagates from mirror 254 toward mirror 250. After the unused portion of second harmonic beam 214 reflects off mirror 250, the unused portion of second harmonic beam 214 keeps diverging in a direction toward mirror 254 and continues to diverge as it subsequently propagates between mirrors 250 and 254 (assuming mirror 250 is a flat mirror). Thus, each time the unused portion of second harmonic beam 214 passes through THG crystal 232, the beam mode (e.g., beam radius and beam divergence) of the unused portion of second harmonic beam 214 will be different, which results in a significantly deteriorated third or higher order harmonic beam quality and conversion efficiency. Accordingly, as noted in column 9, lines 6-9 of Zhou, the beam quality factor (i.e., $M^2$ factor) of the third or higher order harmonic beam is 1.6, which is likely larger than what could be achieved without recycling the unused portion of second harmonic beam 214. As a point of reference, a diffraction-limited Gaussian beam has an $M^2$ factor of 1.0.

Thus, the present inventors have recognized a need for a system and method for recycling an unused portion of an intermediate harmonic beam (e.g., a second harmonic beam) to improve higher order harmonic beam generation efficiency (e.g., third or higher order harmonic beam generation efficiency) without sacrificing higher order harmonic beam quality.

DETAILED DESCRIPTION OF PREFERRED EMBODIMENTS

With reference to the above-listed drawings, this section describes particular embodiments and their detailed construction and operation. The embodiments described herein are set forth by way of illustration only. In light of the teachings herein, skilled persons will recognize that there may be equivalents to what is expressly or inherently taught herein. For example, variations can be made to the embodiments described herein and other embodiments are possible.

For the sake of clarity and conciseness, certain aspects of components or steps of certain embodiments are presented without undue detail where such detail would be apparent to skilled persons in light of the teachings herein and/or where such detail would obfuscate an understanding of more pertinent aspects of the embodiments.

Figure 1:
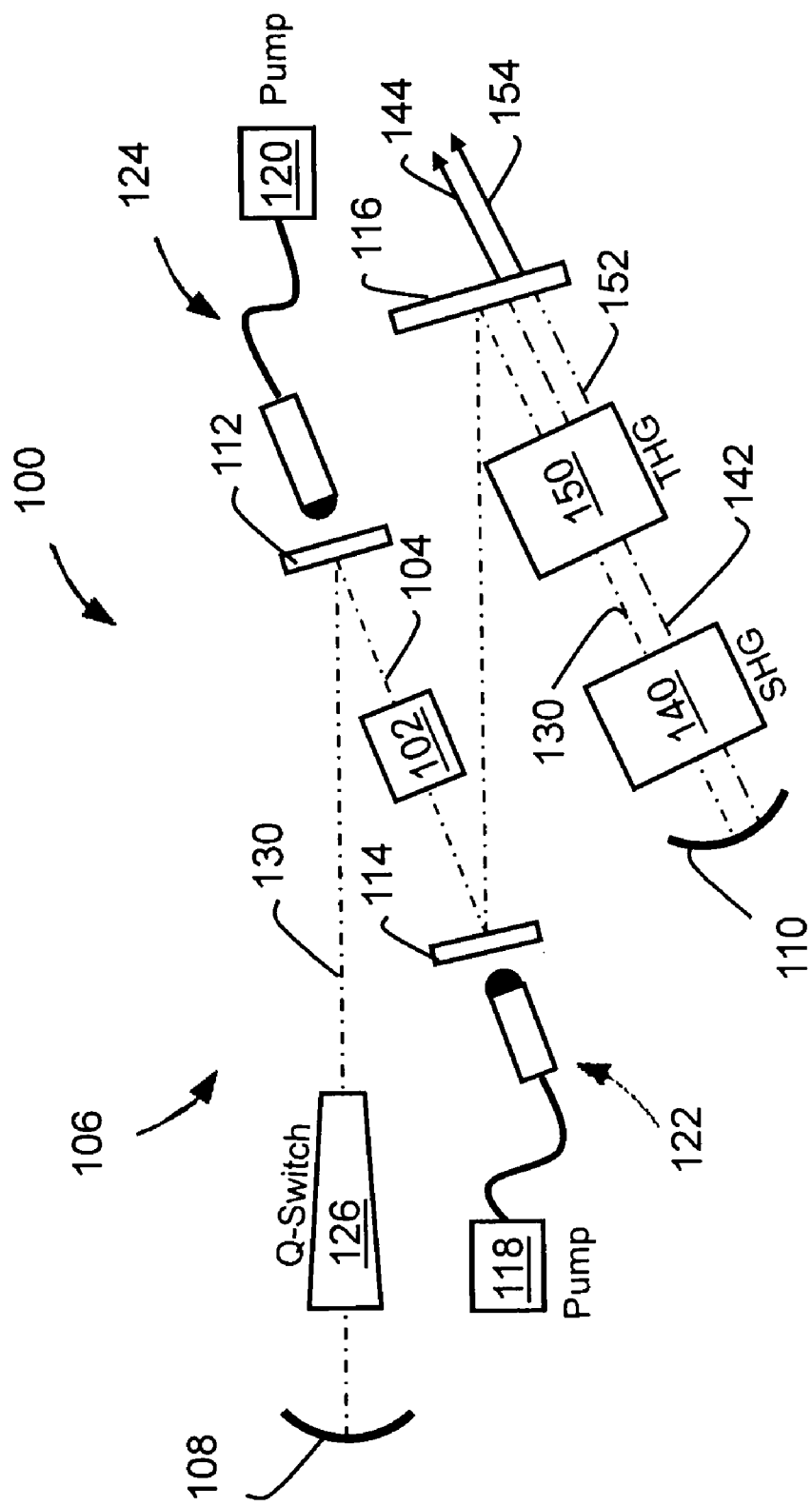
FIG. 1 is a schematic diagram of a prior art laser that generates a third harmonic laser beam without recycling an unused portion of a second harmonic laser beam.
Figure 2:
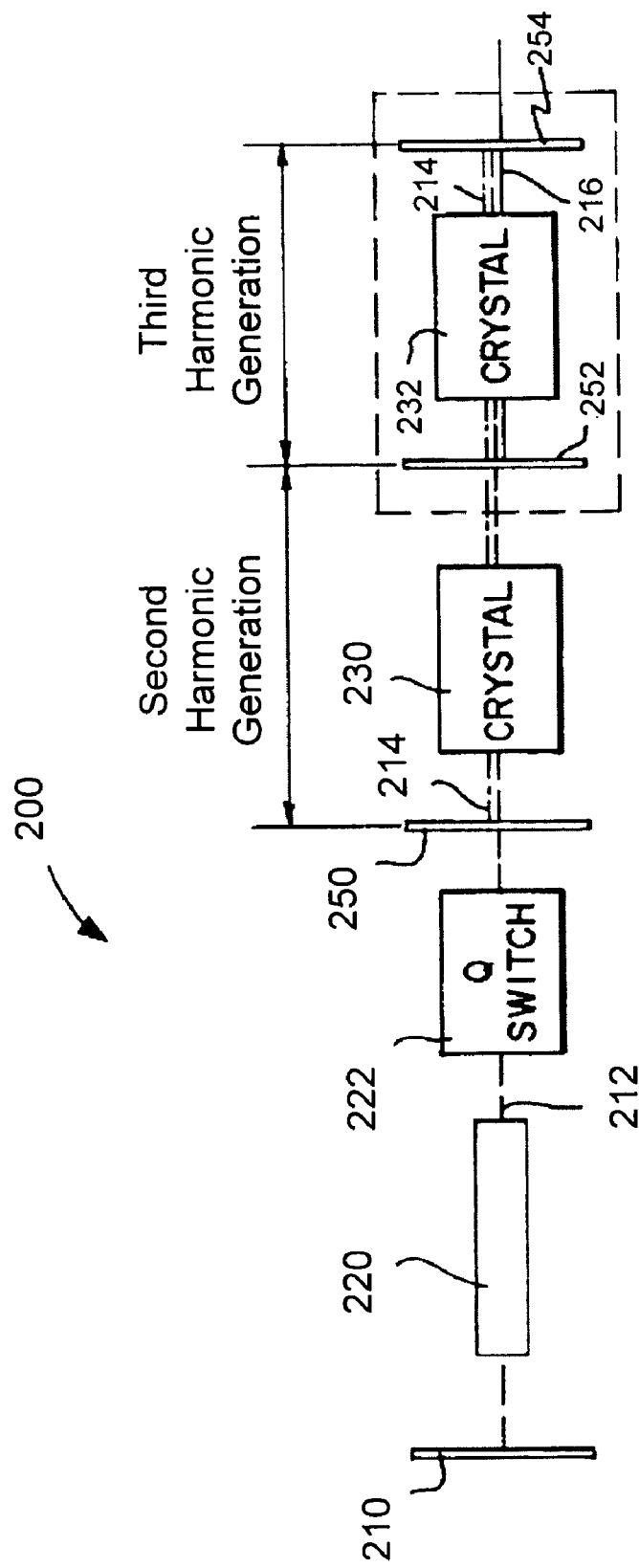
FIG. 2 is a schematic diagram of a prior art laser that recycles an unused portion of a second harmonic laser beam when generating a third harmonic laser beam, but which results in a significantly deteriorated third harmonic beam quality.
Figure 3:
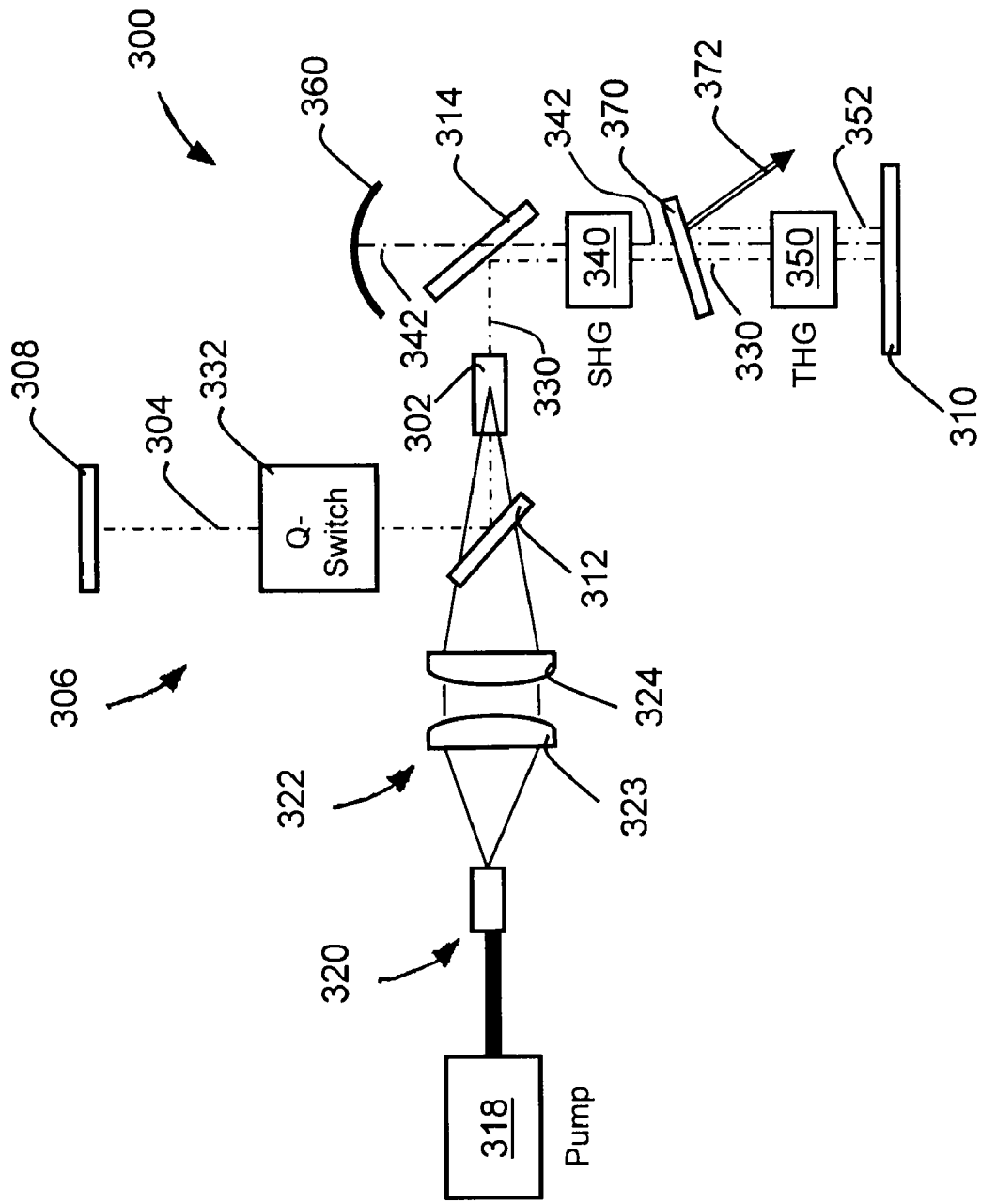
FIG. 3 is a schematic diagram of a laser that efficiently generates a third harmonic laser beam by recycling an unused portion of a second harmonic laser beam while maintaining third harmonic beam quality, according to one embodiment.

FIG. 3 is a schematic diagram of a laser 300 that efficiently generates a third harmonic laser beam 372 by recycling an unused portion of a second harmonic laser beam while maintaining third harmonic beam quality, according to one embodiment. Laser 300 employs a laser medium 302 positioned along an optical path 304 of a standing-wave resonant laser cavity 306 formed by end mirrors 308 and 310, an optical input coupler 312, and an optical energy coupler 314. Preferably, laser medium 302 is interposed between optical input coupler 312 and optical energy coupler 314, but laser medium 302 may be positioned elsewhere along optical path 304. Laser medium 302 preferably comprises a conventional solid-state lasant or gain medium, such as YAG, YLF, YVO$_4$, YALO, sapphire, alexandrite, or CrLiSAF compositions, that is doped with Nd, Yb, Er, Cr, or Tm. Laser medium 302 preferably produces laser radiation or laser beam energy having an infrared (IR) fundamental wavelength, such as 750-800 nm, 1064 nm, 1047 nm, or 1320 nm, but a variety of other wavelengths may be produced, such as visible wavelengths. In addition, other laser media or types of lasers could be employed including, a gas, $CO_2$, excimer, or copper vapor laser. Other elements known in the art, such as the structural frame for holding components are included with laser 300, but not shown in FIG. 3 for clarity of illustration.

Laser 300 is optically pumped by a laser diode pump 318. An optical fiber 320 directs laser radiation generated by laser diode pump 318 through a lens assembly 322 comprising a pair of plano-convex lenses 323 and 324, which focus the laser radiation onto laser medium 302 through optical pumping input coupler 312. Another laser diode pump may be provided along with an associated optical fiber and lens assembly to pump laser 300 through optical energy coupler 314. Thus, laser 300 may be pumped through input coupler 312, optical energy coupler 314, or both. According to a preferred embodiment, laser radiation generated by laser diode pump 318 has a wavelength of about 880 to 900 nm. Preferably, optical pumping input coupler 312 is interposed between end mirror 308 and optical energy coupler 314, but optical pumping input coupler 312 may be positioned elsewhere along optical path 304. As a laser beam 330 (e.g., laser beam energy) having a fundamental wavelength resonates or oscillates within resonant laser cavity 306 between end mirrors 308 and 310, laser medium 302 amplifies laser beam 330 to a selected optical power. Providing a single resonant laser cavity 306 to build up laser beam 330 helps ensure that the fundamental laser beam energy inside resonant laser cavity 306 is self-phase locked. If the fundamental laser beam energy is generated by another resonant laser cavity and injected into cavity 306, a feedback loop may be necessary to phase lock the incoming fundamental laser beam energy with the fundamental laser beam energy inside cavity 306. While laser medium 302 is preferably continuous wave (CW) pumped by a diode laser or diode laser array, any conventional laser pumping device or laser pumping scheme can be employed. For example, laser medium 302 may be end-pumped or side-pumped. In addition, laser 300 may be a pulsed pumped laser.

A Q-switch 332 is positioned within resonant laser cavity 306 along optical path 304. Preferably, Q-switch 332 is interposed between end mirror 308 and optical pumping input coupler 312, but Q-switch 332 may be positioned elsewhere along optical path 304. Q-switch 332 is driven at an appropriate pulse repetition rate (PRR) to obtain short energetic pulses from laser 300. Thus, Q-switch 332 helps generate high intensity pulses, which help improve higher order harmonic generation efficiency. According to some embodiments, Q-switch 332 may be omitted. Q-switch 332 preferably comprises an acousto-optic Q-switch (AO-QS), but may comprise another device that can be quickly switched between low-loss and high-loss states, such as an electro-optic Q-switch, a mechanical Q-switch, or a passive Q-switch.

A nonlinear medium 340 is positioned along optical path 304 within resonant laser cavity 306. Preferably, nonlinear medium 340 is interposed between optical energy coupler 314 and end mirror 310, but nonlinear medium 340 may be positioned elsewhere along optical path 304. Nonlinear medium 340 is preferably oriented such that laser beam 330 strikes an optical surface of nonlinear medium 340 at normal incidence. As laser beam 330 passes through nonlinear medium 340, nonlinear medium 340 generates a laser beam 342 having a wavelength that is a fraction of the fundamental wavelength. In other words, nonlinear medium 340 interacts with and converts at least a portion of the laser beam energy at the fundamental wavelength propagating along optical path 304 into laser beam energy having a wavelength that is a harmonic fraction of the fundamental wavelength. Preferably, nonlinear medium 340 comprises a nonlinear crystal adapted to generate a second harmonic wavelength from the fundamental wavelength, such as $AgGaS_2$ (silver gallium selenite), $AgGaSe_2$, BBO, BIBO (bismuth triborate), KTA (potassium titanyle arsenate, $KTiOAsO_4$), KTP, KDP (potassium dihydrogen phosphate, $KH_2PO_4$), KD*P/KDP, $LiNbO_3$ (lithium niobate), $LiIO_3$ (lithium iodate), LBO, and derivatives thereof. Preferably, the nonlinear crystal is configured for type II phase matching, but the nonlinear crystal may also be configured for type I phase matching if additional components are used, such as one or more waveplates. In addition, the nonlinear crystal may comprise a Brewster cut crystal. Thus, nonlinear medium 340 preferably generates laser beam 342 having one-half the wavelength of laser beam 330 (i.e., a frequency that is twice the fundamental frequency of laser beam 330).

An anti-reflection (AR) coating may optionally be applied to nonlinear medium 340. For example, a single or multilayer dielectric coating having AR characteristics at the fundamental and second harmonic wavelengths may be applied to an optical surface of nonlinear medium 340.

A higher order harmonic nonlinear medium 350 is also positioned along optical path 304 within resonant laser cavity 306. Thus, higher order harmonic nonlinear medium 350 is in optical association with resonant laser cavity 306. Preferably, higher order harmonic nonlinear medium 350 is interposed between nonlinear medium 340 and end mirror 310, but higher order harmonic nonlinear medium 350 may be positioned elsewhere along optical path 304. Higher order harmonic nonlinear medium 350 is preferably oriented such that laser beam 330, laser beam 342, or both, strike an optical surface of higher order harmonic nonlinear medium 350 with normal incidence. Higher order harmonic nonlinear medium 350 converts laser radiation or energy having a harmonic wavelength, such as a first harmonic, second harmonic, third harmonic, or a combination of one or more of the first, second, or third harmonics, into laser radiation having one or more selected harmonic wavelengths, such as a second harmonic, third harmonic, fourth harmonic, or fifth harmonic. In a preferred embodiment, higher order harmonic nonlinear medium 350 converts laser radiation having a fundamental wavelength and laser radiation having a second harmonic wavelength into laser radiation having a third harmonic wavelength. Thus, as laser beam 330 and laser beam 342 pass through higher order harmonic nonlinear medium 350, higher order harmonic nonlinear medium 350 generates a laser beam 352 having one-third of the wavelength of laser beam 330 (i.e., a frequency that is three times the fundamental frequency of laser beam 330). Higher order harmonic nonlinear medium 350 may comprise any of the nonlinear crystals described with reference to nonlinear medium 340 and may comprise the same or different nonlinear crystal as nonlinear medium 340. The nonlinear crystal may be configured for either type I or type II phase matching.

Although laser beams 330, 342 and 352 propagate superimposed along at least a portion optical path 304 (e.g., laser beams 330 and 342 are superimposed between optical energy coupler 314 and end mirror 310 and laser beams 330, 342 and 352 are superimposed between end mirror 310 and an intracavity output coupler 370), laser beams 330, 342 and 352 are shown axially offset from one another for illustration purposes.

An AR coating may optionally be applied to higher order harmonic nonlinear medium 350. For example, a single or multilayer dielectric coating having AR characteristics at the fundamental wavelength, second harmonic wavelength, and third harmonic wavelength may be applied to an optical surface of higher order harmonic nonlinear medium 350.

Optical energy coupler 314 is positioned within resonant laser cavity 306 along optical path 304. Thus, optical energy coupler 314 is positioned in optical association with laser medium 302 and nonlinear medium 340. Preferably, optical energy coupler 314 is interposed between laser medium 302 and nonlinear medium 340, but optical energy coupler 314 may be positioned elsewhere along optical path 304. According to a preferred embodiment, optical energy coupler 314 is a flat mirror adapted to be reflective of laser beam 330 and anti-reflective of laser beam 342. Thus, optical energy coupler 314 essentially separates laser beam 330 and laser beam 342. For example, a single or multilayer dielectric coating having highly reflective (HR) characteristics, such as over about 99.5% reflection, at the fundamental wavelength and having AR characteristics, such as less than about 5% reflection, at the second harmonic wavelength may be applied to optical energy coupler 314. According to a preferred embodiment, a coating is applied to both opposing optical surfaces of optical energy coupler 314. A first coating having HR characteristics, such as over about 99.5% reflection, at the fundamental wavelength (e.g., 1064 nm) at about a 45° angle of incidence and having AR characteristics, such as less than about 5% reflection, at the second harmonic wavelength (e.g., 532 nm) at about a 45° angle of incidence is applied to an optical surface of optical energy coupler 314 facing laser medium 302 and nonlinear medium 340. A second coating having AR characteristics, such as less than about 1% reflection, at the second harmonic wavelength (e.g., 532 nm) at about a 45° angle of incidence is applied to an optical surface of optical energy coupler 314 facing a curved mirror 360. Thus, optical energy coupler 314 directs almost all of the incident fundamental laser beam energy between laser medium 302 and nonlinear medium 340. In addition, optical energy coupler 314 directs almost all of the incident second harmonic laser beam energy out of resonant laser cavity 306. Thus, the second harmonic laser beam energy not reflected by optical energy coupler 314 exits resonant laser cavity 306 as residual second harmonic laser beam energy (e.g., the portion of laser beam 342 between optical energy coupler 314 and curved mirror 360). Separation of the second harmonic laser beam energy from the fundamental laser beam energy at optical energy coupler 314 may help prevent damage to laser medium 302 and other optical components.

Residual second harmonic laser beam energy is reflected back into resonant laser cavity 306 by mode-matching optics 360, which are set in optical association with optical energy coupler 314. According to a preferred embodiment, mode-matching optics 360 comprise a curved mirror. The reflected residual second harmonic laser beam energy propagates through higher order harmonic nonlinear medium 350 so that higher order harmonic nonlinear medium 350 can convert at least a portion of the reflected residual second harmonic laser beam energy into laser beam 352. Thus, the residual second harmonic laser beam energy is recycled (instead of being wasted) and is used to generate additional higher order laser beam energy (e.g., third harmonic laser beam energy).

As will be described in more detail below, a radius of curvature and position of curved mirror 360 are selected so that a beam mode (e.g., beam radius and beam divergence) of the reflected residual second harmonic laser beam energy substantially matches a beam mode of residual second harmonic laser beam energy. In other words, a radius of curvature and position of curved mirror 360 (e.g., relative to optical energy coupler 314) are selected so that a beam radius and a beam divergence of the reflected second harmonic laser beam energy are essentially the same as a beam radius and a beam divergence of the incoming second harmonic laser beam energy everywhere along a beam path of the incoming second harmonic laser beam (e.g., between end mirror 310 and curved mirror 360). Maintaining a substantially uniform beam radius and beam divergence of laser beam 342 helps improve higher order laser beam energy (e.g., third harmonic laser beam energy) generation efficiency without affecting a beam mode of the higher order laser beam energy and without significantly deteriorating a beam quality of the higher order laser beam energy.

For example, laser 300 may be designed such that end mirror 310 is positioned coincident with a beam waist of the fundamental laser beam energy. Thus, as the fundamental laser beam energy propagates from optical energy coupler 314 to end mirror 310, the fundamental laser beam energy converges. In addition, as the second harmonic laser beam energy, which is generated by nonlinear medium 340 from at least a portion of the fundamental laser beam energy, propagates from nonlinear medium 340 to end mirror 310, the second harmonic laser beam energy converges. A portion of the second harmonic laser beam energy is not used by higher order harmonic nonlinear medium 350 to generate the third harmonic laser beam energy. Thus, the unused portion of the second harmonic laser beam energy is reflected by end mirror 310 and propagates back-and-forth between mirrors 310 and 360.

After being reflected by end mirror 310, the fundamental laser beam energy begins diverging and the unused portion of the second harmonic laser beam energy begins diverging. Thus, the fundamental laser beam energy diverges as it propagates from end mirror 310 toward optical energy coupler 314. Nonlinear medium 340 generates additional second harmonic laser beam energy as the diverging fundamental laser beam energy passes through the nonlinear medium 340 in a direction toward optical energy coupler 314. Thus, the residual second harmonic laser beam energy may comprise the additional second harmonic laser beam energy (e.g., the second harmonic laser beam energy generated as the fundamental laser beam energy passes through nonlinear medium 340 in a direction toward optical energy coupler 314) and the unused portion of the second harmonic laser beam energy. The unused portion of the second harmonic laser beam energy also diverges as it propagates from end mirror 310 toward optical energy coupler 314. If mirror 360 were flat, the second harmonic laser beam energy would continue to diverge after being reflected by mirror 360. Thus, each time the second harmonic laser beam energy passed through higher order harmonic nonlinear medium 350, a beam mode (e.g., beam radius and beam divergence) of the second harmonic laser beam energy would be different and a significantly deteriorated third harmonic laser beam energy beam quality would result. Accordingly, a radius of curvature and position of curved mirror 360 are selected so that a beam mode of the second harmonic laser beam energy reflected by curved mirror 360 substantially matches a beam mode of the incoming second harmonic laser beam energy (e.g., a beam mode of the second harmonic laser beam energy that is generated by nonlinear medium 340 from the fundamental laser beam energy). In other words, the position and concave shape of curved mirror 360 are selected such that the second harmonic laser beam energy begins converging (e.g., in a similar or identical manner as the second harmonic laser beam energy generated by nonlinear medium 340) after being reflected by curved mirror 360.

A radius of curvature and position of curved mirror 360 can vary based on the design of laser 300. For example, if nonlinear medium 340 generates a Gaussian second harmonic beam, a radius of curvature of curved mirror 360 is selected to substantially match a radius of curvature of a Gaussian beam wavefront of the second harmonic beam at the position of curved mirror 360. In other words, the radius of curvature of the Gaussian beam wavefront is first calculated for a given position of curved mirror 360. Then, the radius of curvature of curved mirror 360 is selected to substantially match the calculated radius of curvature of the Gaussian beam wavefront (at the position of curved mirror 360) so that the second harmonic mode of the reflected beam is preserved. The radius of curvature of a Gaussian beam wavefront at a particular position can be determined from the wavelength of the beam, beam radius at the beam waist, beam quality factor ($M^2$), and distance from the beam waist.

Figure 4A:
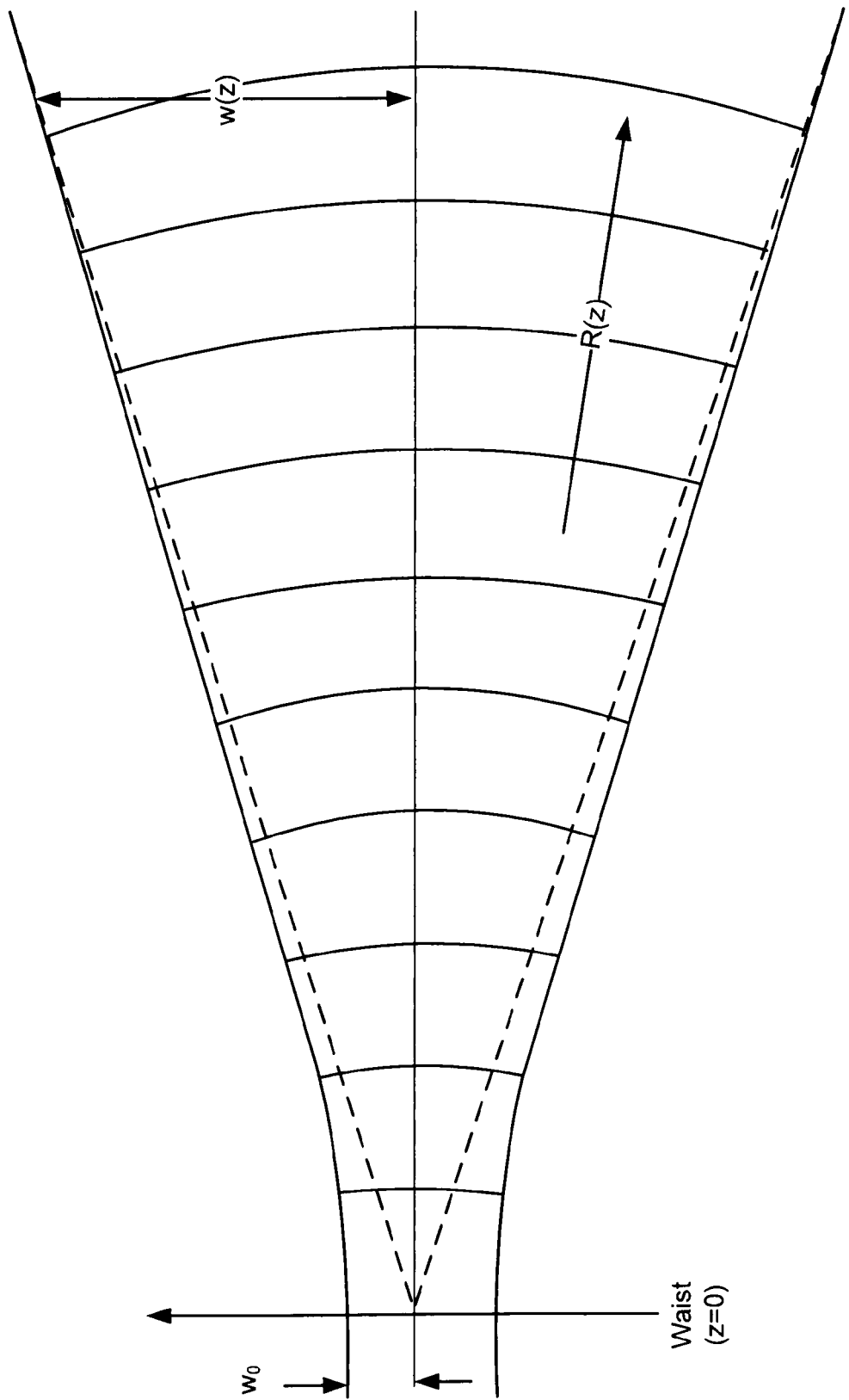
FIG. 4A is a graphical representation of a prior art lowest-order Gaussian beam diverging away from its waist.

For example, FIG. 4A is a graphical representation of a lowest-order Gaussian beam (i.e., where $M^2=1$) diverging away from its waist. A normalized field pattern of the Gaussian beam at another plane z is expressed by Equation 1 and Equation 2, where $w_0$ is the waist radius and the complex radius of curvature $q(z)$ is related to the spot size $w(z)$ and the radius of curvature $R(z)$ of the wavefront at any plane z by the definition in Equation 3.

$$\tilde{u}(x, y, z) = \left(\frac{2}{\pi}\right)^{1/2} \frac{\tilde{q}_0}{w_0 \tilde{q}(z)} \exp\left[-jkz - jk\frac{x^2 + y^2}{2\tilde{q}(z)}\right] \quad (1)$$

$$\tilde{u}(x, y, z) = \left(\frac{2}{\pi}\right)^{1/2} \frac{\exp[-jkz + j\psi(z)]}{w(z)} \exp\left[-\frac{x^2 + y^2}{w^2(z)} - jk\frac{x^2 + y^2}{2R(z)}\right] \quad (2)$$

$$\frac{1}{\tilde{q}(z)} \equiv \left[\frac{1}{R(z)} - j\frac{\lambda}{\pi w^2(z)}\right] \quad (3)$$

The initial value (e.g., at the beam waist) of the complex radius of curvature $q(z)$ is shown in Equation 4, where $\lambda$ is the wavelength of the radiation in which the beam is propagating.

$$\tilde{q}_0 = j\frac{\pi w_0^2}{\lambda} = jzR \quad (4)$$

Thus, if the complex radius of curvature $q(z)$ at a position z is known, the radius of curvature of the wavefront R can be calculated from $q(z)$.

The complex radius of curvature $q(z)$ of a beam changes as the beam propagates through various optical elements, such as free space or a lens. Thus, the complex radius of curvature $q(z)$ after propagating through one or more optical elements can be calculated from a complex radius of curvature $q(z)$ at a known position. A beam waist size, beam waist location, and beam quality factor ($M^2$) can be obtained through measurement. Thus, the complex radius of curvature $q(z)$ can be calculated at the beam waist using Equation 4.

Figure 4B:
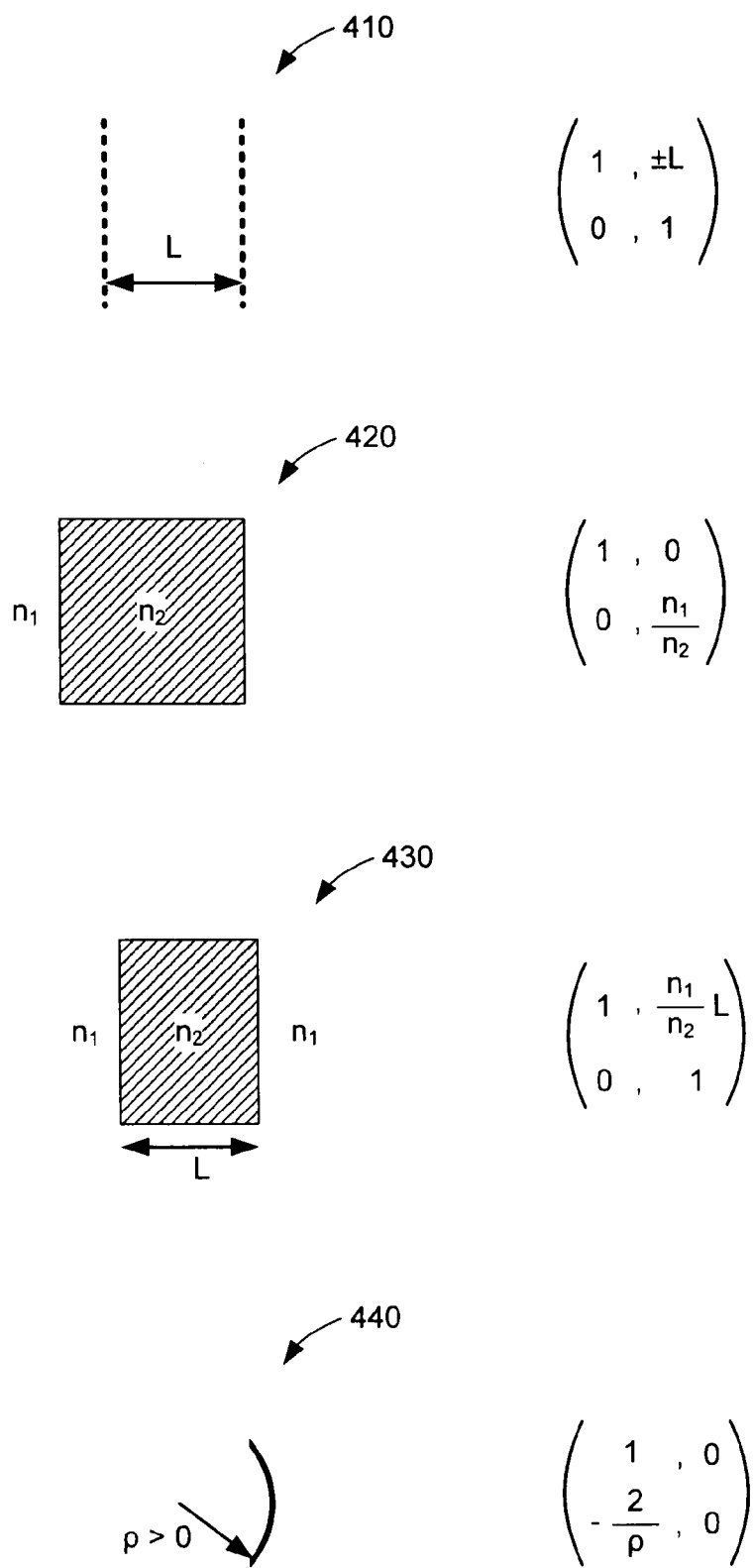
FIG. 4B is a schematic diagram illustrating various prior art optical elements and associated transfer matrices.

An optical element can be expressed mathematically by a transfer matrix, such as the transfer matrix shown in Equation 5. FIG. 4B illustrates various optical elements and associated transfer matrices. Transfer matrices for other optical elements are well known. Optical element 410 represents free space, optical element 420 represents a plane dielectric interface, optical element 430 represents a plane dielectric slab having a thickness L, and optical element 440 represents a spherical mirror. Matrix multiplication rules can be applied to derive a single transfer matrix for a multi-element system.

$$\begin{pmatrix} A & B \\ C & D \end{pmatrix} \quad (5)$$

The complex radius of curvature q2 of a beam after propagating through an optical element can be calculated from the known complex radius of curvature q1 (e.g., at the beam waist) and the optical element transfer matrix as shown in Equation 6.

$$q2 = \left( \frac{Aq1 + B}{Cq1 + D} \right) \quad (6)$$

If the beam quality factor ($M^2$) is greater than one, the wavefront radius of curvature is the same as the lowest-order Gaussian beam having a waist radius shown in Equation 7, where $w_0$ is the beam waist radius.

$$\frac{w_0}{\sqrt{M^2}} \quad (7)$$

EXAMPLE

By way of example, end mirror 310 of FIG. 3 is positioned coincident with the beam waist and curved mirror 360 is positioned 282 mm from end mirror 310. A radius of curvature of the Gaussian beam wavefront (of the second harmonic beam) is calculated to be 400 mm at a distance of 282 mm from end mirror 310. Thus, a concave shape is chosen for curved mirror 360, and the radius of curvature of curved mirror 360 is selected to be 400 mm. Accordingly, a beam radius and beam divergence for the second harmonic beam are maintained everywhere along the beam path as the second harmonic beam propagates back-and-forth between end mirror 310 and curved mirror 360 inside of a cavity defined by end mirror 310 and curved mirror 360.

Figure 4C:
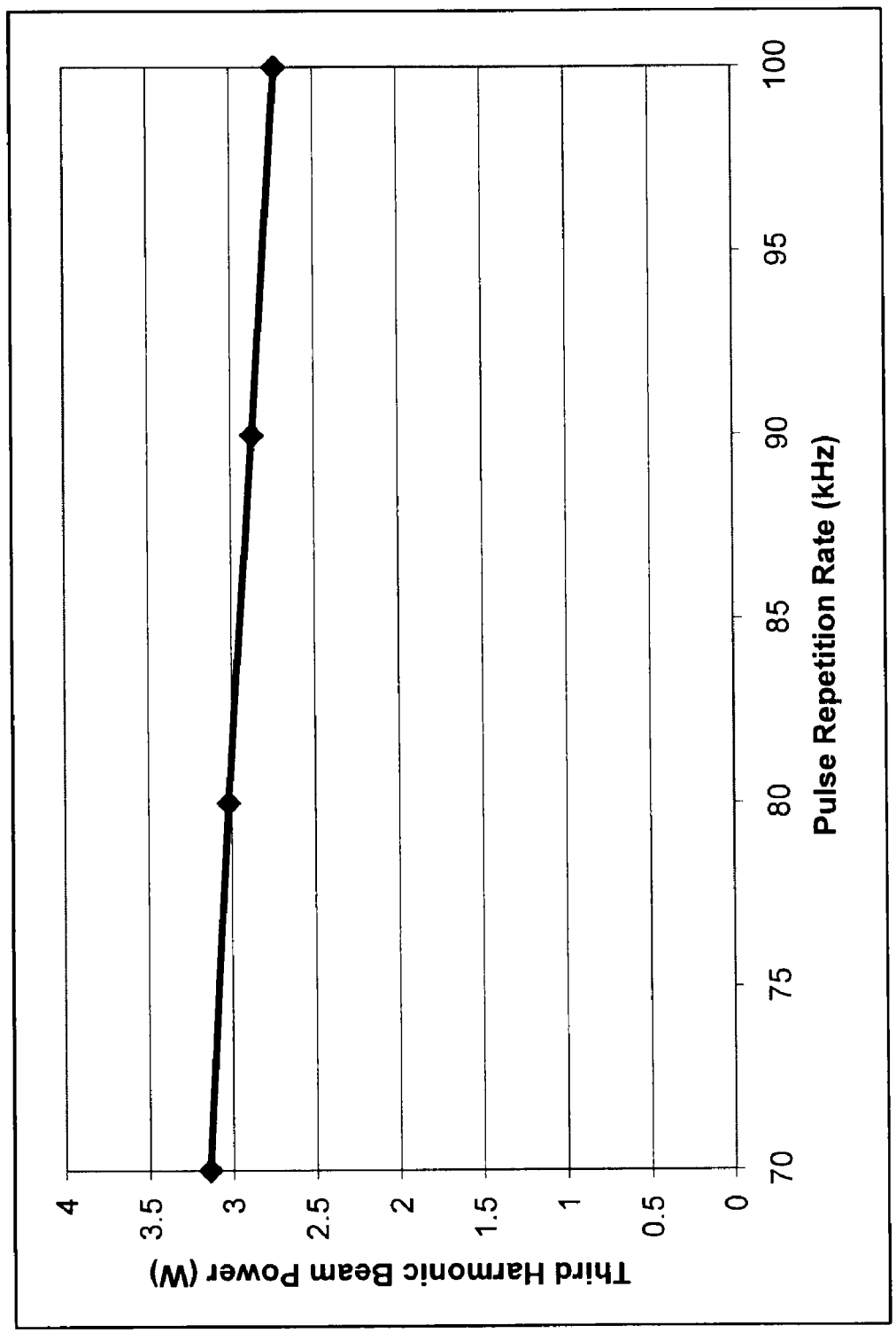
FIG. 4C is a graph illustrating a change in third harmonic beam power over a range of pulse repetition rates.

In operation, a laser having the configuration shown in FIG. 3 produced a third harmonic beam having a beam quality factor ($M^2$) of 1.2 and an average power of 2.73 watts. Curved mirror 360 had a radius of curvature of 400 mm and was positioned 282 mm from end mirror 310. The fundamental beam wavelength was 1064 nm, the second harmonic wavelength was 532 nm, and the third harmonic wavelength was 355 nm. Laser medium 302 was pumped with a 30 watt laser diode 318, and Q-switch 332 was driven at a pulse repetition rate (PRR) of 100 kHz. By recycling the second harmonic laser beam, the third harmonic beam power was increased by about 35%. As shown in FIG. 4C, varying the pulse repetition rate resulted in a slight variation in the third harmonic beam power (average power). The third harmonic beam power ranged from about 3.14 watts at a 70 kHz PRR to about 2.73 watts at a 100 kHz PRR.

If a position of curved mirror 360 is adjusted (e.g., moved closer to end mirror 310), a radius of curvature of the Gaussian beam wavefront at the adjusted position can be calculated so that a corresponding radius of curvature can be selected for curved mirror 360. In a similar vein, a position of curved mirror 360 can be adjusted to compensate for changes in the radius of curvature of curved mirror 360. In addition, if end mirror 310 is changed from a flat mirror to a curved mirror, a position of curved mirror 360, a radius of curvature of curved mirror 360, or both, may be adjusted accordingly so that the second harmonic mode of the beam reflected between mirrors 310 and 360 is preserved. While examples have been provided in which curved mirror 360 is selected to have a concave shape, it is possible that curved mirror 360 is selected to have a convex shape (e.g., to make the reflected beam diverge upon reflection) or a flat shape (e.g., a radius of curvature may be selected to be infinity).

In addition, mode-matching optics comprising one or more lenses and curved mirror 360 may be used to match a beam mode of the reflected residual second harmonic laser beam energy with a beam mode of the residual second harmonic laser beam energy. For example, a lens (or more than one lens) may be interposed between optical energy coupler 314 and curved mirror 360. Thus, curved mirror 360 may have a radius of curvature set to infinity and the lens may have a radius of curvature (e.g., to make the beam converge or diverge), a position (e.g., relative to curved mirror 360), or both, selected so that a beam radius and a beam divergence of the reflected second harmonic laser beam energy (e.g., the second harmonic laser beam energy reflected by curved mirror 360) are essentially the same as a beam radius and a beam divergence of the incoming second harmonic laser beam energy everywhere along a beam path of the incoming second harmonic laser beam (e.g., between end mirror 310 and curved mirror 360). The lens may also cooperate with the radius of curvature of curved mirror 360 to help preserve the second harmonic beam mode (e.g., if a radius of curvature of curved mirror 360 is not set to infinity). For example, a combination of a radius of curvature of curved mirror 360, a position of curved mirror 360, a radius of curvature of the lens, and a position of the lens may be selected so that a beam radius and a beam divergence of the reflected second harmonic laser beam energy are essentially the same as a beam radius and a beam divergence of the incoming second harmonic laser beam energy everywhere along a beam path of the incoming second harmonic laser beam. While the lens may be interposed between curved mirror 360 and optical energy coupler 314, the lens (or more than one lens) may be positioned anywhere along the path of the second harmonic laser beam energy to preserve the second harmonic beam mode. In addition, according to one embodiment, the mode-matching optics comprise one or more lenses that are used to match a beam mode of the reflected residual second harmonic laser beam energy with a beam mode of the residual second harmonic laser beam energy.

Curved mirror 360 is preferably positioned outside of resonant laser cavity 306, but may be positioned within resonant laser cavity 306. Positioning curved mirror 360 outside of resonant laser cavity 306 can simplify the procedure of aligning curved mirror 360 with end mirror 310. For example, the position of curved mirror 360 can be adjusted without impacting laser beam 330. In addition, positioning curved mirror 360 outside of resonant laser cavity 306 can simplify the design of curved mirror 360. For example, the radius of curvature of curved mirror 360 can be selected based on the second harmonic laser beam without regard to the fundamental laser beam. Further, curved mirror 360 can be designed to have HR characteristics for the second harmonic laser beam energy without having to design curved mirror 360 to have HR characteristics or AR characteristics for other wavelengths, such as the fundamental laser beam energy or a third or higher harmonic laser beam energy. For example, a coating having HR characteristics, such as over about 99.8% reflection, at the second harmonic wavelength (e.g., 532 nm) may be applied to an optical surface of curved mirror 360 facing optical energy coupler 314. Thus, a more reflective, less complex, and possibly less expensive single or multilayer dielectric coating may be applied to curved mirror 360. In addition, positioning additional elements inside resonant laser cavity 306 increases cavity loss, which results in reduced output power. Further, positioning additional elements inside resonant laser cavity 306 may cause reliability issues. Thus, positioning curved mirror 360 outside of resonant laser cavity 306 helps create a more efficient and more reliable laser that has a higher output power.

According to one embodiment, an intracavity output coupler 370 is positioned within resonant laser cavity 306 along optical path 304. Thus, output coupler 370 is positioned in optical association with nonlinear medium 340 and higher order harmonic nonlinear medium 350. Preferably, output coupler 370 is interposed between nonlinear medium 340 and higher order harmonic nonlinear medium 350, but output coupler 370 may be positioned elsewhere along optical path 304. According to a preferred embodiment, output coupler 370 is a flat mirror adapted to be reflective of laser beam 352 and anti-reflective of laser beams 330 and 342. Thus, output coupler 370 essentially separates laser beam 352 from laser beams 330 and 342. For example, a single or multilayer dielectric coating having HR characteristics, such as over about 95% reflection, at the third harmonic wavelength and having AR characteristics, such as less than about 1% reflection, at the fundamental wavelength and second harmonic wavelength may be applied to output coupler 370. According to a preferred embodiment, a coating is applied to both opposing optical surfaces of output coupler 370. A first coating having HR characteristics, such as over about 95% reflection, at the third harmonic wavelength (e.g., 355 nm) at about a 10° angle of incidence, and having AR characteristics, such as less than about 1% reflection at the fundamental wavelength (e.g., 1064 nm) and less than about 3% reflection at the second harmonic wavelength (e.g., 532 nm) at about a 10° angle of incidence is applied to an optical surface of output coupler 370 facing nonlinear medium 350. A second coating having AR characteristics, such as less than about 0.5% reflection, at the fundamental wavelength (e.g., 1064 nm) and second harmonic wavelength (e.g., 532 nm) at about a 10° angle of incidence is applied to an optical surface of output coupler 370 facing nonlinear medium 340. Thus, output coupler 370 directs almost all of the incident third harmonic laser beam energy out of resonant laser cavity 306. In addition, output coupler 370 permits almost all of the incident fundamental laser beam energy and the second harmonic laser beam energy to propagate through output coupler 370. Thus, the reflected third harmonic laser beam energy exits resonant laser cavity 306 through output coupler 370 as an output third harmonic laser beam 372. Separation of the third harmonic laser beam energy from the fundamental laser beam energy and the second harmonic laser beam energy at output coupler 370 may help prevent damage to nonlinear medium 340, laser medium 302, and other optical components from the third harmonic laser beam energy. The third harmonic laser beam energy may exit resonant laser cavity 306 in other ways. For example, end mirror 310 may include a coating having AR characteristics at the third harmonic wavelength (e.g., 355 nm) to allow the third harmonic laser beam energy to exit resonant laser cavity 306 through end mirror 310. In addition, a reflective, dispersive, or transmissive output coupler may be positioned in optical association with higher order harmonic nonlinear medium 350 to allow the third harmonic laser beam energy to exit resonant laser cavity 306.

According to a preferred embodiment, end mirror 308 is a flat mirror adapted to be reflective of laser beam 330. For example, a single or multilayer dielectric coating having HR characteristics, such as over about 99.8% reflection at the fundamental wavelength (e.g., 1064 nm) at normal incidence may be applied to end mirror 308. End mirror 310 is preferably a flat mirror adapted to be reflective of laser beams 330, 342, and 352. For example, a single or multilayer dielectric coating having HR characteristics, such as over about 99.5% reflection at the fundamental wavelength (e.g., 1064 nm) at normal incidence and over about 99% reflection at the second harmonic wavelength (e.g., 532 nm) and the third harmonic wavelength (e.g., 355 nm) at normal incidence may be applied to end mirror 310. Optical input coupler 312 is preferably a flat mirror adapted to be reflective of laser beam 330 and transmissive of the laser radiation generated by laser diode pump 318. For example, a single or multilayer dielectric coating having highly reflective (HR) characteristics, such as over about 99.5% reflection, at the fundamental wavelength and having AR characteristics, such as less than about 2% reflection, at the wavelength generated by laser diode pump 318 may be applied to optical input coupler 312. According to a preferred embodiment, a coating is applied to both opposing optical surfaces of optical input coupler 312. A first coating having HR characteristics, such as over about 99.5% reflection, at the fundamental wavelength (e.g., 1064 nm) at about a 45° angle of incidence and having AR characteristics, such as less than about 2% reflection, at the wavelength generated by laser diode pump 318 (e.g., about 880 to 900 nm) at about a 45° angle of incidence is applied to an optical surface of optical input coupler 312 facing laser medium 302. A second coating having AR characteristics, such as less than about 0.8% reflection, at the wavelength generated by laser diode pump 318 (e.g., about 880 to 900 nm) at about a 45° angle of incidence is applied to an optical surface of optical input coupler 312 facing lens assembly 322.

Figure 5:
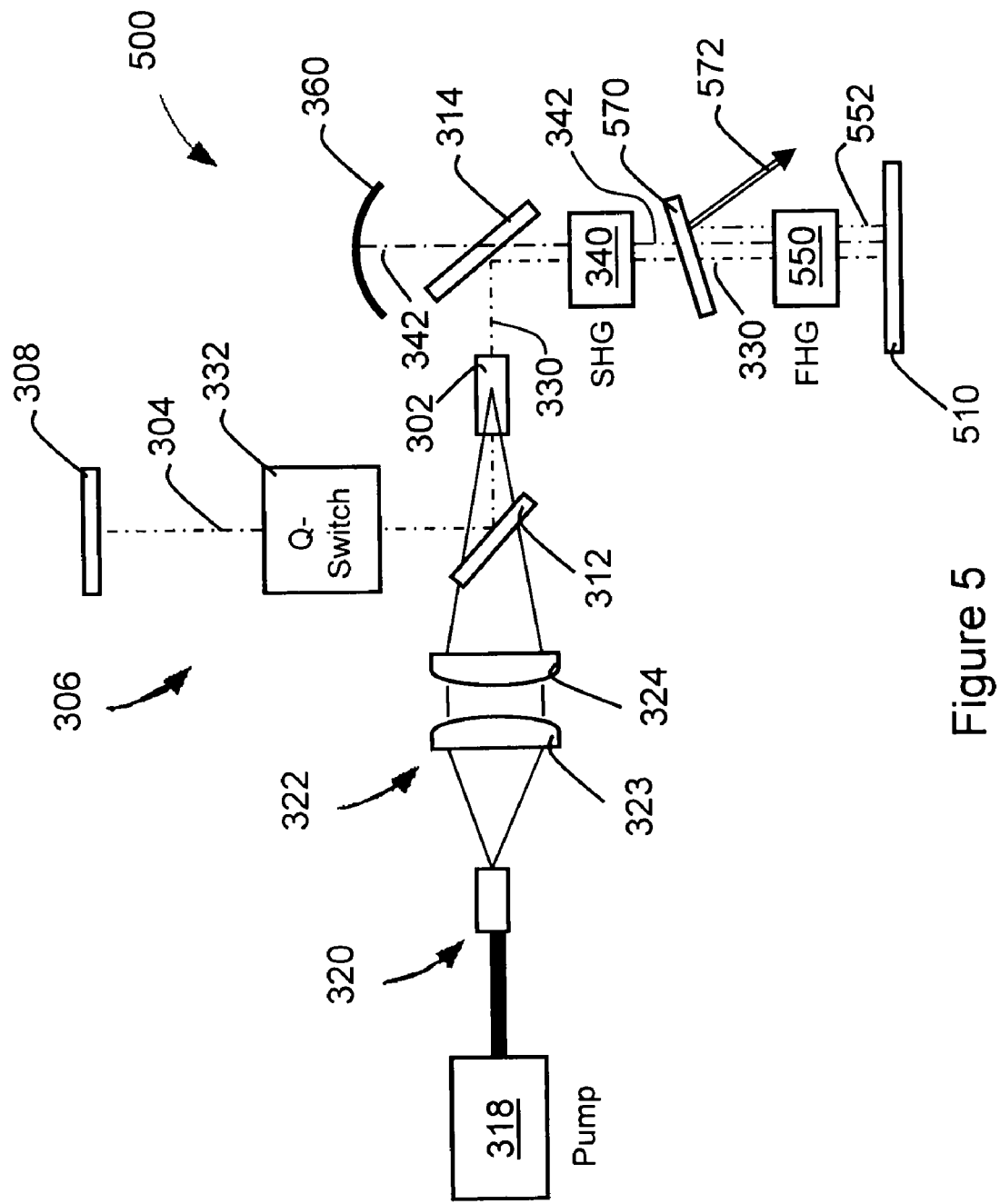
FIGS. 5, 6, 7, and 8 are schematic diagrams of lasers that efficiently generate a fourth harmonic laser beam by recycling an unused portion of a second harmonic laser beam while maintaining fourth harmonic beam quality, according to various embodiments.

FIG. 5 is a schematic diagram of a laser 500 that efficiently generates a fourth harmonic laser beam 572 by recycling an unused portion of a second harmonic laser beam while maintaining fourth harmonic beam quality, according to one embodiment. Laser 500 is similar to laser 300 described with reference to FIG. 3 but is adapted to generate fourth harmonic laser beam 572.

Laser 500 incorporates a higher order harmonic nonlinear medium 550 in place of higher order harmonic nonlinear medium 350. Higher order harmonic nonlinear medium 550 is adapted to convert laser radiation or energy having the second harmonic wavelength into laser radiation having a fourth harmonic wavelength. Higher order harmonic nonlinear medium 550 is positioned along optical path 304 within resonant laser cavity 306, which is formed by end mirror 308 and an end mirror 510. Thus, higher order harmonic nonlinear medium 550 is in optical association with resonant laser cavity 306. Preferably, higher order harmonic nonlinear medium 550 is interposed between nonlinear medium 340 and end mirror 510, but higher order harmonic nonlinear medium 550 may be positioned elsewhere along optical path 304. Higher order harmonic nonlinear medium 550 is preferably oriented such that laser beam 330, laser beam 342, or both, strike an optical surface of higher order harmonic nonlinear medium 550 at normal incidence. As laser beam 342 passes through higher order harmonic nonlinear medium 550, higher order harmonic nonlinear medium 550 generates a laser beam 552 having one-quarter of the wavelength of laser beam 330 (i.e., a frequency that is four times the fundamental frequency of laser beam 330). Higher order harmonic nonlinear medium 550 may comprise any of the nonlinear crystals described with reference to nonlinear mediums 340 and 350 and may comprise the same or different nonlinear crystal as nonlinear mediums 340 and 350. According to a preferred embodiment, higher order harmonic nonlinear medium 550 comprises a doubling crystal that is configured for type I phase matching, but the crystal may also be configured for type II phase matching.

Although laser beams 330, 342 and 552 propagate superimposed along at least a portion optical path 304 (e.g., laser beams 330 and 342 are superimposed between optical energy coupler 314 and end mirror 510 and laser beams 330, 342 and 552 are superimposed between end mirror 510 and an intracavity output coupler 570), laser beams 330, 342, and 552 are shown axially offset from one another for illustration purposes.

An AR coating may optionally be applied to higher order harmonic nonlinear medium 550. For example, a single or multilayer dielectric coating having AR characteristics at the fundamental wavelength, second harmonic wavelength, and fourth harmonic wavelength may be applied to an optical surface of higher order harmonic nonlinear medium 550.

End mirror 510 is similar to end mirror 310, but is adapted to be reflective of laser beams 330, 342, and 552. For example, a single or multilayer dielectric coating having HR characteristics, such as over about 99% reflection, at the fundamental wavelength, the second harmonic wavelength, and the fourth harmonic wavelength may be applied to end mirror 510.

According to one embodiment, intracavity output coupler 570 is positioned within resonant laser cavity 306 along optical path 304. Intracavity output coupler 570 is similar to intracavity output coupler 370, but is adapted to be reflective of laser beam 552 and anti-reflective of laser beams 330 and 342. Thus, output coupler 570 essentially separates laser beam 552 from laser beams 330 and 342. For example, a single or multilayer dielectric coating having HR characteristics, such as over about 95% reflection, at the fourth harmonic wavelength and having AR characteristics, such as less than about 1% reflection at the fundamental wavelength and second harmonic wavelength may be applied to output coupler 570. Thus, output coupler 570 directs almost all of the incident fourth harmonic laser beam energy out of resonant laser cavity 306. In addition, output coupler 570 permits almost all of the incident fundamental laser beam energy and the second harmonic laser beam energy to propagate through output coupler 570. Thus, the reflected fourth harmonic laser beam energy exits resonant laser cavity 306 through output coupler 570 as an output fourth harmonic laser beam 572. Separation of the fourth harmonic laser beam energy from the fundamental laser beam energy and the second harmonic laser beam energy at output coupler 570 may help prevent damage to nonlinear medium 340, laser medium 302, and other optical components from the fourth harmonic laser beam energy. The fourth harmonic laser beam energy may exit resonant laser cavity 306 in other ways. For example, end mirror 510 may include a coating having AR characteristics at the fourth harmonic wavelength to allow the fourth harmonic laser beam energy to exit resonant laser cavity 306 through end mirror 510. In addition, a reflective or transmissive output coupler may be positioned in optical association with higher order harmonic nonlinear medium 550 to allow the fourth harmonic laser beam energy to exit resonant laser cavity 306.

The radius of curvature and position of curved mirror 360 (e.g., relative to optical energy coupler 314) is selected as described with reference to FIG. 3. Thus, the radius of curvature and position of curved mirror 360 are selected so that a beam radius and a beam divergence of the reflected second harmonic laser beam energy are essentially the same as a beam radius and a beam divergence of the incoming second harmonic laser beam energy everywhere along a beam path of the incoming second harmonic laser beam (e.g., between end mirror 510 and curved mirror 360). In addition, mode-matching optics similar or identical to that described with reference to FIG. 3 may be used to match a beam mode of the reflected second harmonic laser beam energy with a beam mode of the incoming second harmonic laser beam energy. Maintaining a substantially uniform beam radius and beam divergence of laser beam 342 helps improve fourth harmonic laser beam energy generation efficiency without affecting a beam mode of the fourth harmonic laser beam energy and without significantly deteriorating a beam quality of the fourth harmonic laser beam energy.

Figure 6:
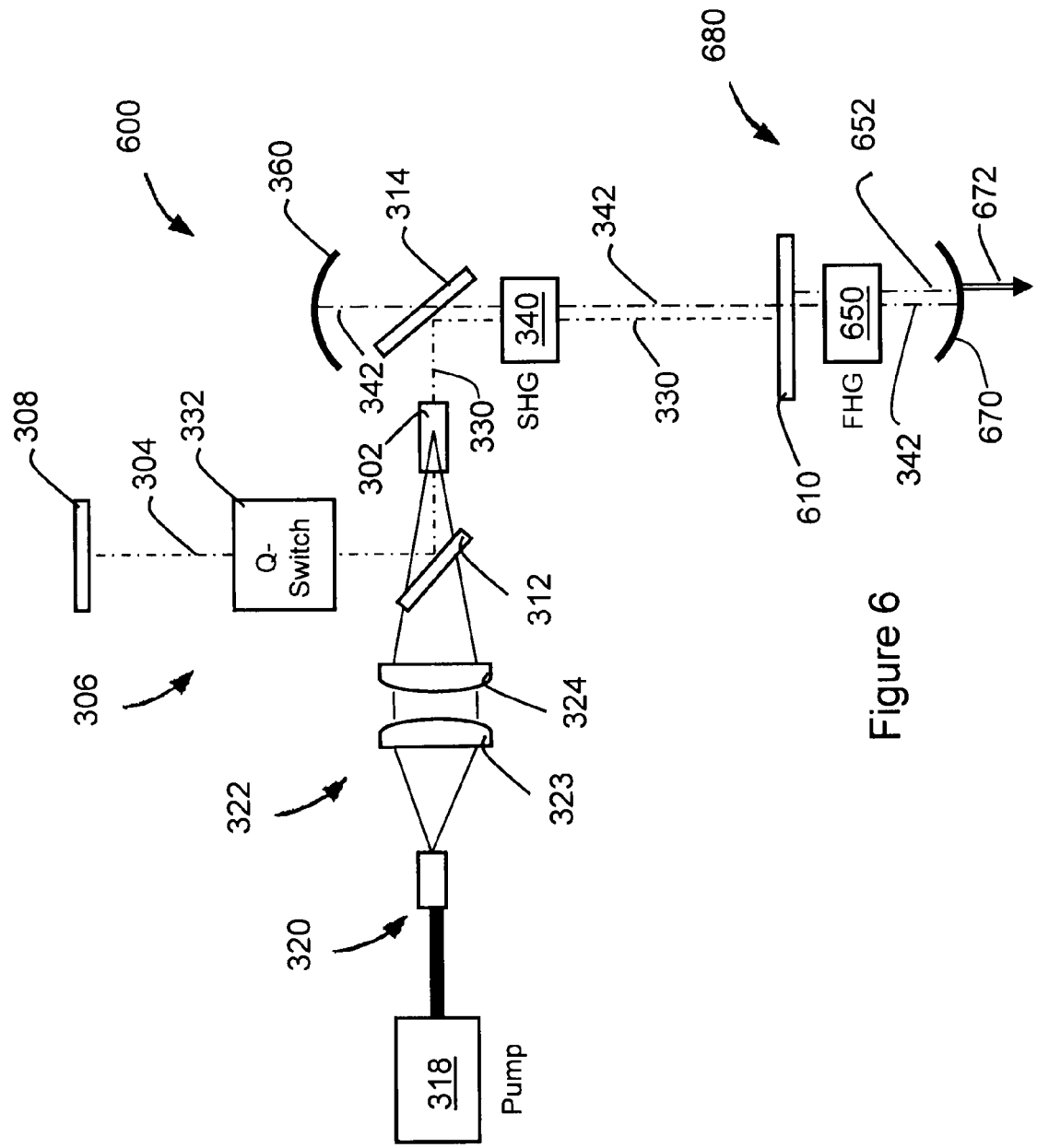

FIG. 6 is a schematic diagram of a laser 600 that efficiently generates a fourth harmonic laser beam 672 by recycling an unused portion of a second harmonic laser beam while maintaining fourth harmonic beam quality, according to another embodiment. Laser 600 is similar to laser 300 described with reference to FIG. 3 but is adapted to generate fourth harmonic laser beam 672 with a higher order harmonic nonlinear medium 650 positioned outside of resonant laser cavity 306.

Laser 600 incorporates higher order harmonic nonlinear medium 650 instead of higher order harmonic nonlinear medium 350. Higher order harmonic nonlinear medium 650 is adapted to convert laser radiation or energy having the second harmonic wavelength into laser radiation having a fourth harmonic wavelength. Higher order harmonic nonlinear medium 650 is positioned outside of resonant laser cavity 306, which is formed by end mirror 308 and an end mirror 610, so that higher order harmonic nonlinear medium 650 is in optical association with resonant laser cavity 306. Preferably, higher order harmonic nonlinear medium 650 is positioned on a side of end mirror 610 opposite nonlinear medium 340. Higher order harmonic nonlinear medium 650 is preferably oriented such that laser beam 342 strikes an optical surface of higher order harmonic nonlinear medium 650 with normal incidence. As laser beam 342 passes through higher order harmonic nonlinear medium 650, higher order harmonic nonlinear medium 650 generates a laser beam 652 having one-quarter of the wavelength of laser beam 330 (i.e., a frequency that is four times the fundamental frequency of laser beam 330). Higher order harmonic nonlinear medium 650 may comprise any of the nonlinear crystals described with reference to nonlinear mediums 340 and 350 and may comprise the same or different nonlinear crystal as nonlinear mediums 340 and 350. According to a preferred embodiment, higher order harmonic nonlinear medium 650 comprises a doubling crystal that is configured for type I phase matching, but the crystal may also be configured for type II phase matching.

Although laser beams 330 and 342 propagate superimposed along at least a portion optical path 304 (e.g., laser beams 330 and 342 are superimposed between optical energy coupler 314 and end mirror 610), laser beams 330 and 342 are shown axially offset from one another for illustration purposes. In addition, although laser beams 342 and 652 propagate superimposed between end mirror 610 and a curved extracavity output coupler 670, laser beams 342 and 652 are shown axially offset from each other for illustration purposes.

An AR coating may optionally be applied to higher order harmonic nonlinear medium 650. For example, a single or multilayer dielectric coating having AR characteristics at the fundamental wavelength, second harmonic wavelength, and fourth harmonic wavelength may be applied to an optical surface of higher order harmonic nonlinear medium 650.

End mirror 610 is similar to end mirror 310, but is adapted to be reflective of laser beams 330 and 652 and anti-reflective of laser beam 342. For example, a single or multilayer dielectric coating having HR characteristics, such as over about 95% reflection, at the fundamental wavelength and fourth harmonic wavelength and having AR characteristics, such as less than about 1% reflection, at the second harmonic wavelength may be applied to end mirror 610. In addition, a coating may be applied to both opposing optical surfaces of end mirror 610. Thus, end mirror 610 reflects almost all of the incident fundamental laser beam energy back toward nonlinear medium 340 and reflects almost all of the incident fourth harmonic laser beam energy toward an curved output coupler 670. In addition, end mirror 610 allows almost all of the incident second harmonic laser beam energy to pass through end mirror 610.

A curved extracavity output coupler 670 is positioned outside of resonant laser cavity 306 so that output coupler 670 is in optical association with higher order harmonic nonlinear medium 650. According to a preferred embodiment, output coupler 670 is positioned such that higher order harmonic nonlinear medium 650 is interposed between end mirror 610 and output coupler 670. Output coupler 670 is adapted to be reflective of laser beam 342 and anti-reflective of laser beam 652. Thus, output coupler 670 essentially separates laser beam 652 from laser beam 342. For example, a single or multilayer dielectric coating having HR characteristics, such as over about 95% reflection, at the second harmonic wavelength and having AR characteristics, such as less than about 1% reflection, at the fourth harmonic wavelength may be applied to output coupler 670. Thus, output coupler 670 reflects almost all of the incident second harmonic laser beam energy back toward higher order harmonic nonlinear medium 650 and curved mirror 360. In addition, output coupler 670 permits almost all of the incident fourth harmonic laser beam energy to propagate through output coupler 670 and thus out of a cavity 680 formed by end mirror 610 and output coupler 670. Thus, the transmitted fourth harmonic laser beam energy exits cavity 680 through output coupler 670 as an output fourth harmonic laser beam 672. The fourth harmonic laser beam energy may exit cavity 680 in other ways. For example, a reflective or transmissive output coupler may be positioned in optical association with higher order harmonic nonlinear medium 650 to allow the fourth harmonic laser beam energy to exit cavity 680.

A radius of curvature and position of output coupler 670 (e.g., relative to end mirror 610) is selected in a similar manner as described with reference to curved mirror 360 of FIG. 3. Thus, the radius of curvature and position of output coupler 670 are selected so that a beam mode (e.g., beam radius and beam divergence) of the reflected second harmonic laser beam energy substantially matches a beam mode of the incoming second harmonic laser beam energy (e.g., the portion of the second harmonic laser beam energy that was not used to generate the fourth harmonic laser beam energy). In other words, a radius of curvature and position of output coupler 670 are selected so that a beam radius and a beam divergence of the reflected second harmonic laser beam energy are essentially the same as a beam radius and a beam divergence of the incoming second harmonic laser beam energy everywhere along a beam path of the incoming second harmonic laser beam (e.g., between output coupler 670 and curved mirror 360). Maintaining a substantially uniform beam radius and beam divergence of laser beam 342 helps improve higher order laser beam energy (e.g., fourth harmonic laser beam energy) generation efficiency without affecting a beam mode of the higher order laser beam energy and without significantly deteriorating a beam quality of the higher order laser beam energy.

For example, laser 600 may be designed such that end mirror 610 is positioned coincident with a beam waist of the fundamental laser beam energy. Thus, as the fundamental laser beam energy propagates from optical energy coupler 314 to end mirror 610, the fundamental laser beam energy converges. In addition, as the second harmonic laser beam energy, which is generated by nonlinear medium 340 from at least a portion of the fundamental laser beam energy, propagates from nonlinear medium 340 to end mirror 610, the second harmonic laser beam energy converges.

After being reflected by end mirror 610, the fundamental laser beam energy begins diverging as it propagates from end mirror 610 toward optical energy coupler 314. After passing through end mirror 610, the second harmonic laser beam energy begins diverging and continues to diverge as it propagates toward higher order harmonic nonlinear medium 650. A portion of the second harmonic laser beam energy is not used by higher order harmonic nonlinear medium 650 to generate the fourth harmonic laser beam energy. Thus, the unused portion of the second harmonic laser beam energy is reflected by output coupler 670 and propagates back-and-forth between output coupler 670 and curved mirror 360.

If output coupler 670 were flat, the unused portion of the second harmonic laser beam energy would continue to diverge after being reflected by output coupler 670. Thus, each time the unused portion of the second harmonic laser beam energy passed through higher order harmonic nonlinear medium 650, a beam mode (e.g., beam radius and beam divergence) of the unused portion of the second harmonic laser beam energy would be different and a significantly deteriorated fourth harmonic laser beam energy beam quality would result. Accordingly, a radius of curvature and position of output coupler 670 are selected so that a beam mode of the unused portion of the second harmonic laser beam energy reflected by output coupler 670 substantially matches a beam mode of the incoming second harmonic laser beam energy (e.g., a beam mode of the second harmonic laser beam energy that is generated by nonlinear medium 650 from the second harmonic laser beam energy). In other words, the position and concave shape of output coupler 670 are selected such that the unused portion of the second harmonic laser beam energy begins converging (e.g., in a similar or identical manner as the second harmonic laser beam energy generated by nonlinear medium 340 as the fundamental laser beam energy propagates from end mirror 610 toward optical energy coupler 314) after being reflected by output coupler 670.

A radius of curvature and position of output coupler 670 can vary based on the design of laser 600. For example, if nonlinear medium 340 generates a Gaussian second harmonic beam, a radius of curvature of output coupler 670 is selected to substantially match a radius of curvature of a Gaussian beam wavefront of the second harmonic beam at the position of output coupler 670. In other words, the radius of curvature of the Gaussian beam wavefront is first calculated for a given position of output coupler 670. Then, the radius of curvature of output coupler 670 is selected to substantially match the calculated radius of curvature of the Gaussian beam wavefront (at the position of output coupler 670) so that the second harmonic mode of the reflected beam is preserved. The radius of curvature of a Gaussian beam wavefront at a particular position can be determined from the wavelength of the beam, beam radius at the beam waist, beam quality factor ($M^2$), and distance from the beam waist as previously described with reference to FIG. 3.

If a position of output coupler 670 is adjusted (e.g., moved closer to end mirror 610), a radius of curvature of the Gaussian beam wavefront at the adjusted position can be calculated so that a corresponding radius of curvature can be selected for output coupler 670. In a similar vein, a position of output coupler 670 can be adjusted to compensate for changes in the radius of curvature of output coupler 670. While examples have been provided in which output coupler 670 is selected to have a concave shape, it is possible that output coupler 670 is selected to have a convex shape (e.g., to make the reflected beam diverge upon reflection) or flat shape (e.g., a radius of curvature may be selected to be infinity). In addition, mode-matching optics similar or identical to that described with reference to FIG. 3 may be used to match a beam mode of the reflected second harmonic laser beam energy (e.g., reflected by output coupler 670) with a beam mode of the incoming second harmonic laser beam energy.

The radius of curvature and position of curved mirror 360 (e.g., relative to optical energy coupler 314 and output coupler 670) is selected as described with reference to FIG. 3. For example, after the unused portion of the second harmonic laser beam energy is reflected by output coupler 670, the unused portion of the second harmonic laser beam energy begins converging as it propagates toward nonlinear medium 650. As the unused portion of the second harmonic laser beam energy passes through nonlinear medium 650 again, nonlinear medium 650 generates additional fourth harmonic laser beam energy (which is reflected by end mirror 610 and exits cavity 680 via output coupler 670). A portion of the unused portion of the second harmonic laser beam energy is unused and propagates toward end mirror 610. The twice unused portion of the second harmonic laser beam energy will converge as it propagates from nonlinear medium 650 to end mirror 610. After the twice unused portion of the second harmonic laser beam energy propagates through the end mirror 610, the twice unused portion of the second harmonic laser beam energy begins to diverge. The twice unused portion of the second harmonic laser beam energy continues diverging as it propagates from end mirror 610 to curved mirror 360. In addition, the fundamental laser beam energy diverges as it propagates from end mirror 610 toward optical energy coupler 314. Nonlinear medium 340 generates additional second harmonic laser beam energy as the diverging fundamental laser beam energy passes through nonlinear medium 340 in a direction toward optical energy coupler 314. The second harmonic laser beam energy not reflected by optical energy coupler 314 exits resonant laser cavity 306 as residual second harmonic laser beam energy. Thus, residual second harmonic laser beam energy may comprise the additional second harmonic laser beam energy (e.g., the second harmonic laser beam energy generated as the fundamental laser beam energy passes through nonlinear medium 340 in a direction toward optical energy coupler 314) and the twice unused portion of the second harmonic laser beam energy.

If mirror 360 were flat, the residual second harmonic laser beam energy would continue to diverge after reflecting off mirror 360. Thus, as the residual second harmonic laser beam energy passed through nonlinear medium 650, a beam mode (e.g., beam radius and beam divergence) of the residual second harmonic laser beam energy would be different than a beam mode of the second harmonic laser beam energy generated by nonlinear medium 340 and a significantly deteriorated fourth harmonic laser beam energy beam quality would result. Accordingly, a radius of curvature and position of curved mirror 360 are selected so that a beam mode of the residual second harmonic laser beam energy reflected by curved mirror 360 substantially matches a beam mode of the incoming second harmonic laser beam energy (which may include the second harmonic laser beam energy generated by nonlinear medium 340 from the fundamental laser beam energy in a direction toward optical energy coupler 314). In other words, the position and concave shape of curved mirror 360 are selected such that the residual second harmonic laser beam energy begins converging (e.g., in a similar or identical manner as the second harmonic laser beam energy generated by nonlinear medium 340 in a direction toward 610) after being reflected by curved mirror 360.

A radius of curvature and position of curved mirror 360 can vary based on the design of laser 600. For example, if nonlinear medium 340 generates a Gaussian second harmonic beam, a radius of curvature of curved mirror 360 is selected to substantially match a radius of curvature of a Gaussian beam wavefront of the second harmonic beam at the position of curved mirror 360. In other words, the radius of curvature of the Gaussian beam wavefront is first calculated for a given position of curved mirror 360. Then, the radius of curvature of curved mirror 360 is selected to substantially match the calculated radius of curvature of the Gaussian beam wavefront (at the position of curved mirror 360) so that the second harmonic mode of the reflected beam is preserved. The radius of curvature of a Gaussian beam wavefront at a particular position can be determined from the wavelength of the beam, beam radius at the beam waist, beam quality factor ($M^2$), and distance from the beam waist as previously described with reference to FIG. 3.

If a position of curved mirror 360 is adjusted (e.g., moved closer to optical energy coupler 314), a radius of curvature of the Gaussian beam wavefront at the adjusted position can be calculated so that a corresponding radius of curvature can be selected for curved mirror 360. In a similar vein, a position of curved mirror 360 can be adjusted to compensate for changes in the radius of curvature of curved mirror 360. While examples have been provided in which curved mirror 360 is selected to have a concave shape, it is possible that curved mirror 360 is selected to have a convex shape (e.g., to make the reflected beam diverge upon reflection) or flat shape (e.g., a radius of curvature may be selected to be infinity). In addition, mode-matching optics similar or identical to that described with reference to FIG. 3 may be used to match a beam mode of the reflected second harmonic laser beam energy (e.g., reflected by curved mirror 360) with a beam mode of the incoming second harmonic laser beam energy.

Figure 7:
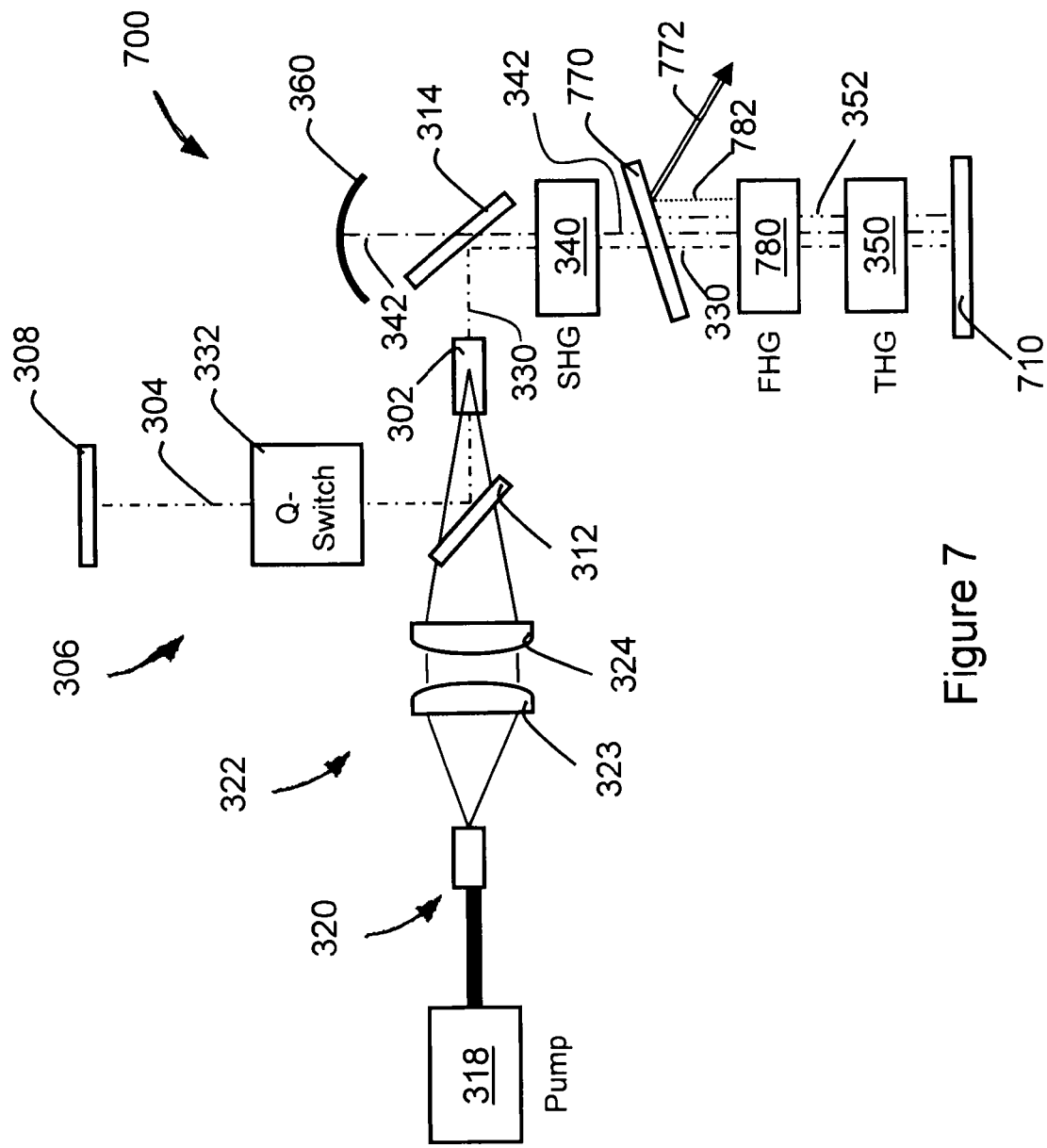

FIG. 7 is a schematic diagram of a laser 700 that efficiently generates a fourth harmonic laser beam 772 by recycling an unused portion of a second harmonic laser beam while maintaining fourth harmonic laser beam quality, according to yet another embodiment. Laser 700 is similar to laser 300 described with reference to FIG. 3 but is adapted to generate fourth harmonic laser beam 772.

Laser 700 incorporates a mixing nonlinear medium 780 in addition to higher order harmonic nonlinear medium 350. As described with reference to FIG. 3, higher order harmonic nonlinear medium 350 is positioned along optical path 304 within resonant laser cavity 306. Preferably, higher order harmonic nonlinear medium 350 is interposed between mixing nonlinear medium 780 and an end mirror 710. Higher order harmonic nonlinear medium 350 is preferably oriented such that laser beam 330, laser beam 342, or both, strike an optical surface of higher order harmonic nonlinear medium 350 with normal incidence. In a preferred embodiment, higher order harmonic nonlinear medium 350 converts laser radiation or energy having a fundamental wavelength and laser radiation or energy having a second harmonic wavelength into laser radiation or energy having a third harmonic wavelength. Thus, as laser beam 330 and laser beam 342 pass through higher order harmonic nonlinear medium 350, higher order harmonic nonlinear medium 350 generates laser beam 352 having one-third of the wavelength of laser beam 330 (i.e., a frequency that is three times the fundamental frequency of laser beam 330). Higher order harmonic nonlinear medium 350 may comprise any of the nonlinear crystals described with reference to nonlinear medium 340 and may comprise the same or different nonlinear crystal as nonlinear medium 340. The nonlinear crystal may be configured for either type I or type II phase matching.

According to one embodiment, mixing nonlinear medium 780 is adapted to convert or mix laser radiation having the fundamental wavelength and laser radiation having the third harmonic wavelength into laser radiation having a fourth harmonic wavelength. Alternatively, mixing nonlinear medium 780 may be adapted to convert or mix laser radiation having the second harmonic wavelength and laser radiation having the third harmonic wavelength into laser radiation having a fifth harmonic wavelength (i.e., to generate a fifth harmonic laser beam 772). Mixing nonlinear medium 780 is positioned along optical path 304 within resonant laser cavity 306, which is formed by end mirror 308 and an end mirror 710. Preferably, mixing nonlinear medium 780 is interposed between an intracavity output coupler 770 and nonlinear medium 350. Mixing nonlinear medium 780 is preferably oriented such that laser beam 330, laser beam 342, laser beam 352, or any combination thereof, strike an optical surface of mixing nonlinear medium 780 at normal incidence. As laser beam 330 and laser beam 352 passes through mixing nonlinear medium 780, mixing nonlinear medium 780 generates a laser beam 782 having one-quarter of the wavelength of laser beam 330 (i.e., a frequency that is four times the fundamental frequency of laser beam 330). Mixing nonlinear medium 780 may comprise any of the nonlinear crystals described with reference to nonlinear mediums 340 and 350 and may comprise the same or different nonlinear crystal as nonlinear mediums 340 and 350. According to a preferred embodiment, mixing nonlinear medium 780 comprises a mixing crystal that is configured for type I phase matching, but the crystal may also be configured for type II phase matching. As shown in FIG. 7, nonlinear medium 340, mixing nonlinear medium 780, and nonlinear medium 350 are in optical series with one another.

Although laser beams 330, 342, 352, and 782 propagate superimposed along at least a portion optical path 304 (e.g., laser beams 330 and 342 are superimposed between optical energy coupler 314 and end mirror 710, laser beams 330, 342 and 352 are superimposed between end mirror 710 and an intracavity output coupler 770, and laser beams 330, 342, 352, and 782 are superimposed between mixing nonlinear medium 780 and intracavity output coupler 770), laser beams 330, 342, 352, and 782 are shown axially offset from one another for illustration purposes.

An AR coating may optionally be applied to higher order harmonic nonlinear medium 350, mixing nonlinear medium 780, or both. For example, a single or multilayer dielectric coating having AR characteristics at the fundamental wavelength, second harmonic wavelength, third harmonic wavelength, and fourth harmonic wavelength may be applied to an optical surface of higher order harmonic nonlinear medium 350, mixing nonlinear medium 780, or both.

End mirror 710 is similar to end mirror 310, but may be adapted to be reflective of laser beam 782 in addition to laser beams 330, 342, and 352. For example, a single or multilayer dielectric coating having HR characteristics, such as over about 99% reflection, at the fundamental wavelength, the second harmonic wavelength, the third harmonic wavelength, and the fourth harmonic wavelength may be applied to end mirror 710.

An intracavity output coupler 770 is positioned within resonant laser cavity 306 along optical path 304, according to one embodiment. Output coupler 770 is similar to intracavity output coupler 370, but is adapted to be reflective of laser beam 782 and anti-reflective of laser beams 330 and 342. Output coupler 770 may be reflective or anti-reflective of laser beam 352. Thus, output coupler 770 essentially separates laser beam 782 from laser beams 330 and 342. For example, a single or multilayer dielectric coating having HR characteristics, such as over about 95% reflection, at the fourth harmonic wavelength and having AR characteristics, such as less than about 1% reflection, at the fundamental wavelength and second harmonic wavelength may be applied to output coupler 770. Thus, output coupler 770 directs almost all of the incident fourth harmonic laser beam energy out of resonant laser cavity 306. In addition, output coupler 770 permits almost all of the incident fundamental laser beam energy and the second harmonic laser beam energy to propagate through output coupler 770. Thus, the reflected fourth harmonic laser beam energy exits resonant laser cavity 306 through output coupler 770 as an output fourth harmonic laser beam 772. Separation of the fourth harmonic laser beam energy from the fundamental laser beam energy and the second harmonic laser beam energy at output coupler 770 may help prevent damage to nonlinear medium 340, laser medium 302, and other optical components. The fourth harmonic laser beam energy may exit resonant laser cavity 306 in other ways. For example, end mirror 710 may include a coating having AR characteristics at the fourth harmonic wavelength to allow the fourth harmonic laser beam energy to exit resonant laser cavity 306 through end mirror 710 (e.g., if the positions of mixing nonlinear medium 780 and nonlinear medium 350 are interchanged). In addition, a reflective or transmissive output coupler may be positioned in optical association with higher order harmonic nonlinear medium 780 to allow the fourth harmonic laser beam energy to exit resonant laser cavity 306.

The radius of curvature and position of curved mirror 360 (e.g., relative to optical energy coupler 314) are selected as described with reference to FIG. 3. Thus, the radius of curvature and position of curved mirror 360 are selected so that a beam radius and a beam divergence of the reflected second harmonic laser beam energy are essentially the same as a beam radius and a beam divergence of the incoming second harmonic laser beam energy everywhere along a beam path of the incoming second harmonic laser beam (e.g., between end mirror 710 and curved mirror 360). In addition, mode-matching optics similar or identical to that described with reference to FIG. 3 may be used to match a beam mode of the reflected second harmonic laser beam energy (e.g., reflected by curved mirror 360) with a beam mode of the incoming second harmonic laser beam energy. Maintaining a substantially uniform beam radius and beam divergence of laser beam 342 helps improve fourth harmonic laser beam energy generation efficiency without affecting a beam mode of the fourth harmonic laser beam energy and without significantly deteriorating a beam quality of the fourth harmonic laser beam energy.

Figure 8:
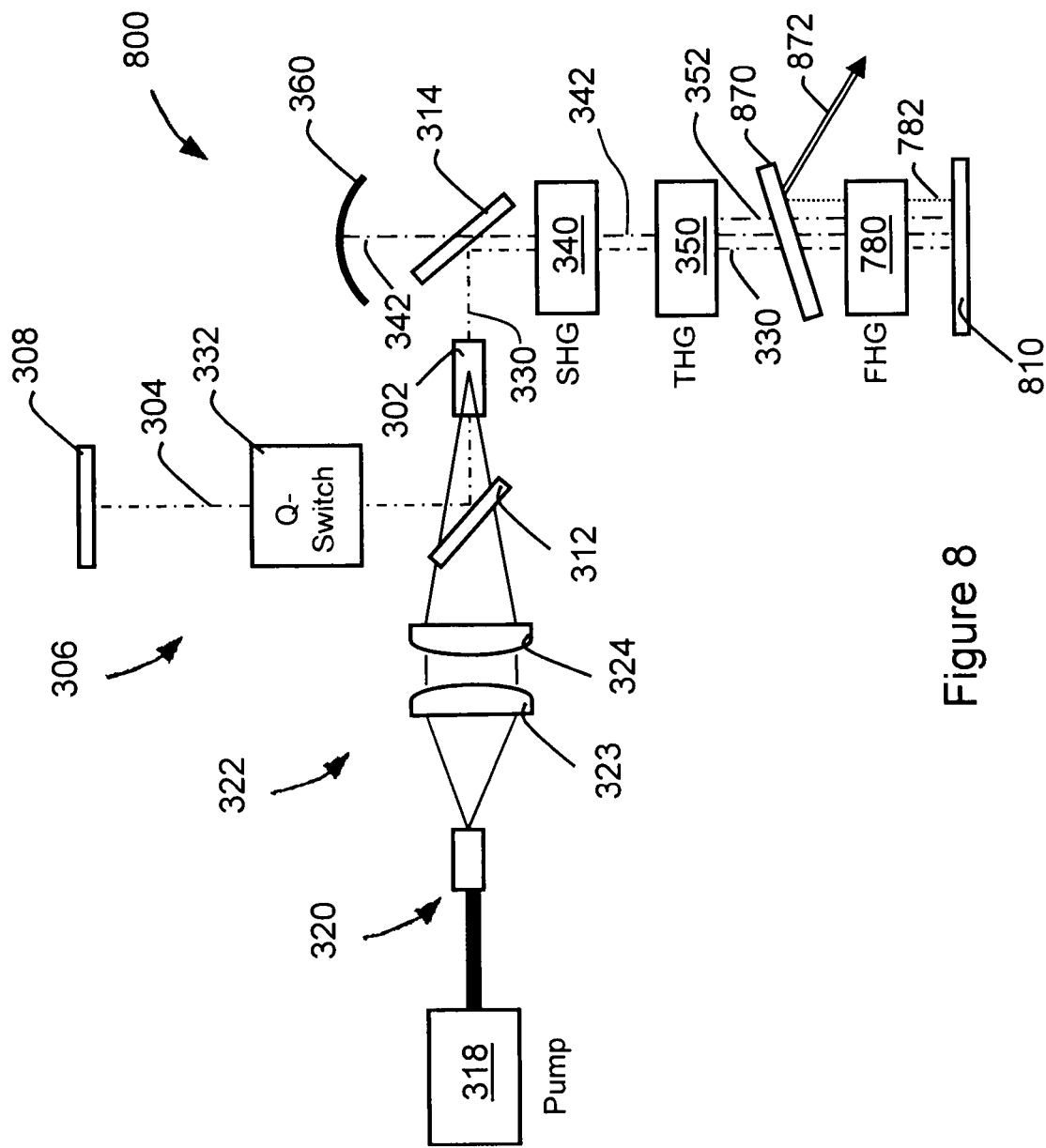

FIG. 8 is a schematic diagram of a laser 800 that efficiently generates a fourth harmonic laser beam 872 by recycling an unused portion of a second harmonic laser beam while maintaining fourth harmonic beam quality, according to still another embodiment. Laser 800 is similar to laser 700 described with reference to FIG. 7 but nonlinear medium 350, mixing nonlinear medium 780, and the output coupler are positioned in a different optical arrangement. In FIG. 7, the components are arranged in an optical array, starting with end mirror 710, followed by nonlinear medium 350, followed by mixing nonlinear medium 780, followed by output coupler 770, and ending with nonlinear element 340. In FIG. 8, the components are arranged in a different optical array, starting with an end mirror 810, followed by mixing nonlinear medium 780, followed by output coupler 870, followed by nonlinear medium 350, and ending with nonlinear element 340.

As described with reference to FIG. 7, higher order harmonic nonlinear medium 350 converts laser radiation or energy having a fundamental wavelength and laser radiation or energy having a second harmonic wavelength into laser radiation or energy having a third harmonic wavelength. Thus, as laser beam 330 and laser beam 342 pass through higher order harmonic nonlinear medium 350, higher order harmonic nonlinear medium 350 generates laser beam 352 having one-third of the wavelength of laser beam 330 (i.e., a frequency that is three times the fundamental frequency of laser beam 330). In addition, as described with reference to FIG. 7 mixing nonlinear medium 780 is adapted to convert or mix laser radiation having the fundamental wavelength and laser radiation having the third harmonic wavelength into laser radiation having a fourth harmonic wavelength, according to one embodiment. Thus, as laser beam 330 and laser beam 352 pass through mixing nonlinear medium 780, mixing nonlinear medium 780 generates a laser beam 782 having one-quarter of the wavelength of laser beam 330 (i.e., a frequency that is four times the fundamental frequency of laser beam 330). Alternatively, mixing nonlinear medium 780 may be adapted to convert or mix laser radiation having the second harmonic wavelength and laser radiation having the third harmonic wavelength into laser radiation having a fifth harmonic wavelength (i.e., to generate a fifth harmonic laser beam 872).

Although laser beams 330, 342, 352, and 782 propagate superimposed along at least a portion optical path 304 (e.g., laser beams 330 and 342 are superimposed between optical energy coupler 314 and end mirror 810, laser beams 330, 342 and 352 are superimposed between nonlinear medium 350 and end mirror 810, and laser beams 330, 342, 352, and 782 are superimposed between end mirror 810 and an intracavity output coupler 870), laser beams 330, 342, 352, and 782 are shown axially offset from one another for illustration purposes.

End mirror 810 is similar to end mirror 310, but is adapted to be reflective of laser beam 782 in addition to laser beams 330, 342, and 352. For example, a single or multilayer dielectric coating having HR characteristics, such as over about 99% reflection, at the fundamental wavelength, the second harmonic wavelength, the third harmonic wavelength, and the fourth harmonic wavelength may be applied to end mirror 810.

An intracavity output coupler 870 is positioned within resonant laser cavity 306 along optical path 304, according to one embodiment. Output coupler 870 is similar to intracavity output coupler 770, but is adapted to be reflective of laser beam 782 and anti-reflective of laser beams 330, 342, and 352. Thus, output coupler 870 essentially separates laser beam 782 from laser beams 330, 342, and possibly 352. Output coupler 870 may be anti-reflective of laser beam 352 in one direction (e.g., as laser beam 352 propagates from nonlinear medium 350 toward end mirror 810) and be reflective of laser beam 352 in the other direction (e.g., as laser beam 352 propagates from end mirror 810 toward output coupler 870) so that the third harmonic laser beam energy that is not used by mixing nonlinear element 780 exits cavity 306). Alternatively, output coupler 870 may be anti-reflective of laser beam 352 in both directions (e.g., as laser beam 352 propagates from nonlinear medium 350 toward end mirror 810 and as laser beam 352 propagates from end mirror 810 toward nonlinear medium 350). A single or multilayer dielectric coating having HR characteristics, such as over about 95% reflection, at the fourth harmonic wavelength and having AR characteristics, such as less than about 1% reflection, at the fundamental wavelength, second harmonic wavelength, and third harmonic wavelength may be applied to output coupler 870. Thus, output coupler 870 directs almost all of the incident fourth harmonic laser beam energy out of resonant laser cavity 306. In addition, output coupler 870 permits almost all of the incident fundamental laser beam energy, the second harmonic laser beam energy, and possibly the third harmonic laser beam energy to propagate through output coupler 870. Thus, the reflected fourth harmonic laser beam energy exits resonant laser cavity 306 through output coupler 870 as an output fourth harmonic laser beam 872. Separation of the fourth harmonic laser beam energy from the fundamental laser beam energy, the second harmonic laser beam energy, and possibly the third harmonic laser beam energy at output coupler 870 may help prevent damage to nonlinear medium 340, laser medium 302, and other optical components from the fourth harmonic laser beam energy. The fourth harmonic laser beam energy may exit resonant laser cavity 306 in other ways. For example, end mirror 810 may include a coating having AR characteristics at the fourth harmonic wavelength to allow the fourth harmonic laser beam energy to exit resonant laser cavity 306 through end mirror 810. In addition, a reflective or transmissive output coupler may be positioned in optical association with higher order harmonic nonlinear medium 780 to allow the fourth harmonic laser beam energy to exit resonant laser cavity 306.

The radius of curvature and position of curved mirror 360 (e.g., relative to optical energy coupler 314) are selected as described with reference to FIG. 3. Thus, the radius of curvature and position of curved mirror 360 are selected so that a beam radius and a beam divergence of the reflected second harmonic laser beam energy are essentially the same as a beam radius and a beam divergence of the incoming second harmonic laser beam energy everywhere along a beam path of the incoming second harmonic laser beam (e.g., between end mirror 810 and curved mirror 360). In addition, mode-matching optics similar or identical to that described with reference to FIG. 3 may be used to match a beam mode of the reflected second harmonic laser beam energy (e.g., reflected by curved mirror 360) with a beam mode of the incoming second harmonic laser beam energy. Maintaining a substantially uniform beam radius and beam divergence of laser beam 342 helps improve fourth harmonic laser beam energy generation efficiency without affecting a beam mode of the fourth harmonic laser beam energy and without significantly deteriorating a beam quality of the fourth harmonic laser beam energy.

Figure 9:
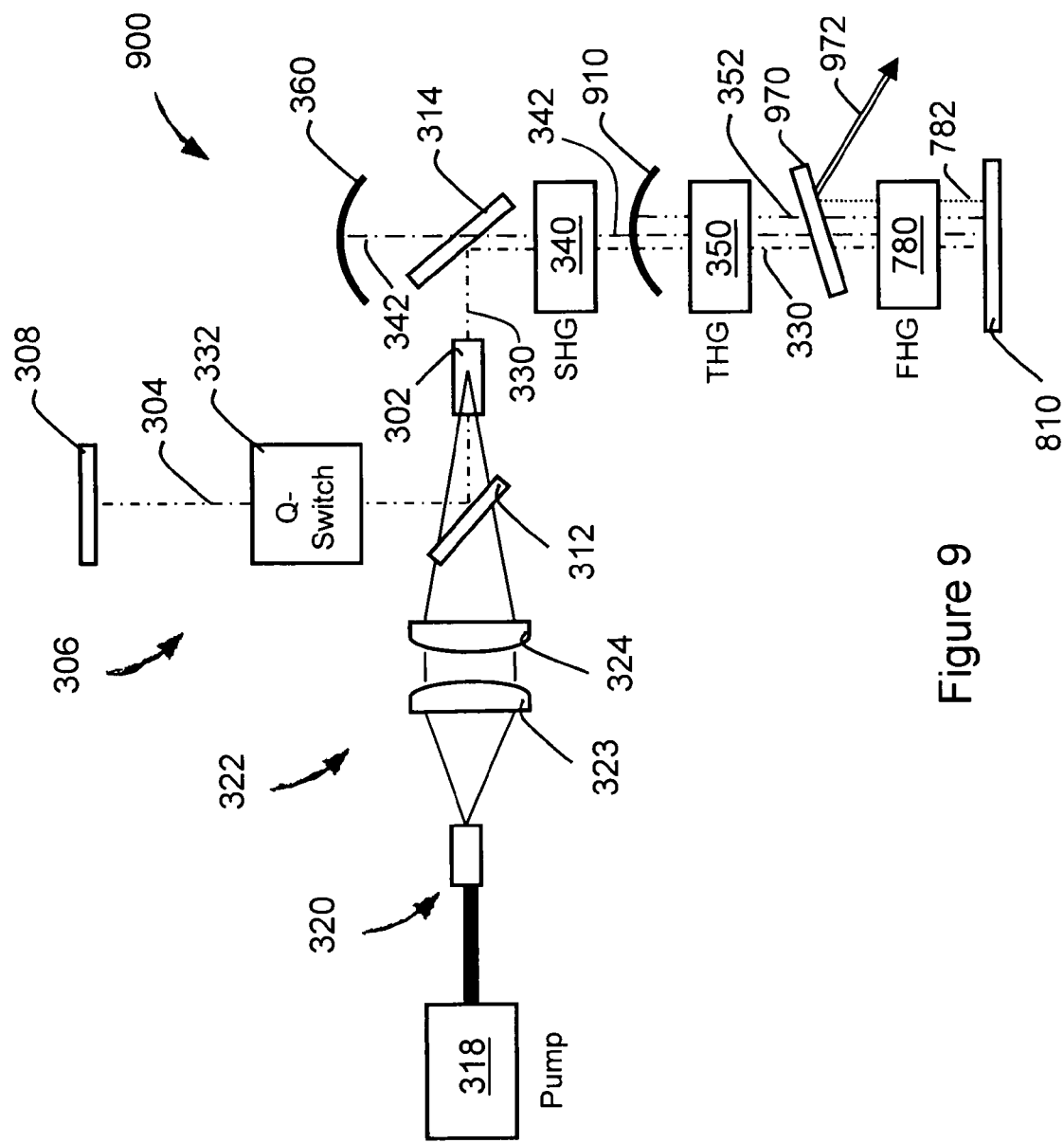
FIG. 9 is a schematic diagram of a laser that efficiently generates a fourth harmonic laser beam by recycling an unused portion of a second harmonic laser beam and an unused portion of a third harmonic laser beam while maintaining fourth harmonic beam quality, according to one embodiment.

FIG. 9 is a schematic diagram of a laser 900 that efficiently generates a fourth harmonic laser beam 972 by recycling an unused portion of a second harmonic laser beam and a third harmonic laser beam while maintaining fourth harmonic beam quality, according to one embodiment. Laser 900 is similar to laser 800 described with reference to FIG. 8, but includes a curved mirror 910 for recycling the third harmonic laser beam energy that was not used by mixing nonlinear element 780 to generate the fourth harmonic laser beam energy. In an alternative embodiment, mixing nonlinear medium 780 may be adapted to convert or mix laser radiation having the second harmonic wavelength and laser radiation having the third harmonic wavelength into laser radiation having a fifth harmonic wavelength (i.e., to generate a fifth harmonic laser beam 972).

Although laser beams 330, 342, 352, and 782 propagate superimposed along at least a portion optical path 304 (e.g., laser beams 330 and 342 are superimposed between optical energy coupler 314 and end mirror 810, laser beams 330, 342 and 352 are superimposed between curved mirror 910 and end mirror 810, and laser beams 330, 342, 352, and 782 are superimposed between end mirror 810 and an intracavity output coupler 970), laser beams 330, 342, 352, and 782 are shown axially offset from one another for illustration purposes.

An intracavity output coupler 970 is positioned within resonant laser cavity 306 along optical path 304, according to one embodiment. Output coupler 970 is similar to intracavity output coupler 870 described with reference to FIG. 8, but is adapted to be reflective of laser beam 782 and anti-reflective of laser beams 330, 342, and 352. In particular, output coupler 970 is anti-reflective of laser beam 352 in both directions (e.g., as laser beam 352 propagates from nonlinear medium 350 toward mixing nonlinear medium 780 and as laser beam 352 propagates from end mirror 810 toward curved mirror 910). Thus, output coupler 970 essentially separates laser beam 782 from laser beams 330, 342, and 352. A single or multilayer dielectric coating having HR characteristics, such as over about 95% reflection, at the fourth harmonic wavelength and having AR characteristics, such as less than about 1% reflection, at the fundamental wavelength, second harmonic wavelength, and third harmonic wavelength may be applied to output coupler 970. Thus, output coupler 970 directs almost all of the incident fourth harmonic laser beam energy out of resonant laser cavity 306. In addition, output coupler 970 permits almost all of the incident fundamental laser beam energy, the second harmonic laser beam energy, and the third harmonic laser beam energy to propagate through output coupler 970. Thus, the reflected fourth harmonic laser beam energy exits resonant laser cavity 306 through output coupler 970 as an output fourth harmonic laser beam 972. Separation of the fourth harmonic laser beam energy from the fundamental laser beam energy, the second harmonic laser beam energy, and the third harmonic laser beam energy at output coupler 970 may help prevent damage to nonlinear medium 340, laser medium 302, and other optical components from the fourth harmonic laser beam energy. The fourth harmonic laser beam energy may exit resonant laser cavity 306 in other ways. For example, end mirror 810 may include a coating having AR characteristics at the fourth harmonic wavelength to allow the fourth harmonic laser beam energy to exit resonant laser cavity 306 through end mirror 810. In addition, a reflective or transmissive output coupler may be positioned in optical association with higher order harmonic nonlinear medium 780 to allow the fourth harmonic laser beam energy to exit resonant laser cavity 306.

Curved mirror 910 is positioned within resonant laser cavity 306 along optical path 304. Curved mirror 910 is preferably adapted to be reflective of laser beam 352 (i.e., the third harmonic laser beam energy) and anti-reflective of laser beams 330 and 342. Thus, curved mirror 910 essentially separates laser beam 352 from laser beams 330 and 342. A single or multilayer dielectric coating having HR characteristics, such as over about 95% reflection, at the third harmonic wavelength and having AR characteristics, such as less than about 1% reflection, at the fundamental wavelength and second harmonic wavelength may be applied to curved mirror 910. Thus, curved mirror 910 reflects almost all of the incident third harmonic laser beam energy back toward mixing nonlinear element 780 so that mixing nonlinear element 780 can generate additional fourth harmonic laser beam energy from the reflected third harmonic laser beam energy. In addition, curved mirror 910 permits almost all of the incident fundamental laser beam energy and the second harmonic laser beam energy to propagate through curved mirror 910. Separation of the third harmonic laser beam energy from the fundamental laser beam energy and the second harmonic laser beam energy at curved mirror 910 allows the third harmonic laser beam energy to be recycled and may help prevent damage to nonlinear medium 340, laser medium 302, and other optical components from the third harmonic laser beam energy.

As will be described in more detail below, a radius of curvature and position of curved mirror 910 are selected so that a beam mode (e.g., beam radius and beam divergence) of the reflected third harmonic laser beam energy (i.e., the reflected unused third harmonic laser beam energy and the reflected third harmonic laser beam energy generated by nonlinear medium 350 in a direction toward curved mirror 910) substantially matches a beam mode of the incoming third harmonic laser beam energy. In other words, a radius of curvature and position of curved mirror 910 (e.g., relative to end mirror 810) is selected so that a beam radius and a beam divergence of the reflected third harmonic laser beam energy are essentially the same as a beam radius and a beam divergence of the incoming third harmonic laser beam energy everywhere along a beam path of the incoming third harmonic laser beam (e.g., between end mirror 810 and curved mirror 910). Maintaining a substantially uniform beam radius and beam divergence of laser beam 352 helps improve higher order laser beam energy (e.g., fourth harmonic laser beam energy) generation efficiency without affecting a beam mode of the higher order laser beam energy and without significantly deteriorating a beam quality of the higher order laser beam energy.

For example, laser 900 may be designed such that end mirror 810 is positioned coincident with a beam waist of the fundamental laser beam energy. Thus, as the fundamental laser beam energy propagates from optical energy coupler 314 to end mirror 810, the fundamental laser beam energy converges. In addition, as the second harmonic laser beam energy, which is generated by nonlinear medium 340 from at least a portion of the fundamental laser beam energy, propagates from nonlinear medium 340 to end mirror 810, the second harmonic laser beam energy converges. Further, as the third harmonic laser beam energy, which is generated by nonlinear medium 350 from at least a portion of the fundamental laser beam energy and at least a portion of the second harmonic laser beam energy, propagates from nonlinear medium 350 to end mirror 810, the third harmonic laser beam energy converges. A portion of the third harmonic laser beam energy will not be used by mixing nonlinear medium 780 to generate the fourth harmonic laser beam energy. Thus, the unused portion of the third harmonic laser beam energy will be reflected by end mirror 810 and propagate back-and-forth between mirrors 810 and 910.

After being reflected by end mirror 810, the fundamental laser beam energy begins diverging, the second harmonic laser beam energy begins diverging, and the unused portion of the third harmonic laser beam energy begins diverging. Thus, the fundamental laser beam energy and the second harmonic laser beam energy diverge as the fundamental and second harmonic energies propagate from end mirror 810 toward optical energy coupler 314. Similarly, the unused portion of the third harmonic laser beam energy diverges as it propagates from end mirror 810 toward curved mirror 910. The diverging fundamental laser beam energy and diverging second harmonic laser beam energy generate additional third harmonic laser beam energy as the diverging fundamental laser beam energy and second harmonic laser beam energy pass through nonlinear element 350. If mirror 910 were flat, the unused portion of the third harmonic laser beam energy and the newly generated third harmonic laser beam energy would continue to diverge after being reflected by mirror 910. Thus, each time the third harmonic laser beam energy passed through mixing nonlinear medium 780, a beam mode (e.g., beam radius and beam divergence) of the third harmonic laser beam energy would be different and a significantly deteriorated fourth harmonic laser beam energy beam quality would result. Accordingly, a radius of curvature and position of curved mirror 910 are selected so that a beam mode of the third harmonic laser beam energy reflected by curved mirror 910 substantially matches a beam mode of the incoming third harmonic laser beam energy (e.g., a beam mode of the unused portion of the third harmonic laser beam energy and a beam mode of the third harmonic laser beam energy that is generated by nonlinear medium 350). In other words, the position and concave shape of curved mirror 910 are selected such that the third harmonic laser beam energy begins converging (e.g., in a similar or identical manner as the third harmonic laser beam energy generated by nonlinear medium 350 as the fundamental laser beam energy and second harmonic laser beam energy propagate from nonlinear medium 340 towards mixing nonlinear medium 780) after being reflected by curved mirror 910.

A radius of curvature and position of curved mirror 910 can vary based on the design of laser 900. For example, if nonlinear medium 350 generates a Gaussian third harmonic beam, a radius of curvature of curved mirror 910 is selected to substantially match a radius of curvature of a Gaussian beam wavefront of the third harmonic beam at the position of curved mirror 910. In other words, the radius of curvature of the Gaussian beam wavefront is first calculated for a given position of curved mirror 910. Then, the radius of curvature of curved mirror 910 is selected to substantially match the calculated radius of curvature of the Gaussian beam wavefront (at the position of curved mirror 910) so that the third harmonic mode of the reflected beam is preserved. The radius of curvature of a Gaussian beam wavefront at a particular position can be determined from the wavelength of the beam, beam radius at the beam waist, beam quality factor ($M^2$), and distance from the beam waist as described with reference to FIG. 3.

If a position of curved mirror 910 is adjusted (e.g., moved closer to end mirror 810), a radius of curvature of the Gaussian beam wavefront at the adjusted position can be calculated so that a corresponding radius of curvature can be selected for curved mirror 910. In a similar vein, a position of curved mirror 910 can be adjusted to compensate for changes in the radius of curvature of curved mirror 910. In addition, if end mirror 810 is changed from a flat mirror to a curved mirror, a position of curved mirror 910, a radius of curvature of curved mirror 910, or both, may be adjusted accordingly so that the third harmonic mode of the beam reflected between mirrors 810 and 910 is preserved. While examples have been provided in which curved mirror 910 is selected to have a concave shape, it is possible that curved mirror 910 is selected to have a convex shape (e.g., to make the reflected beam diverge upon reflection) or flat shape (e.g., a radius of curvature may be selected to be infinity). In addition, mode-matching optics similar or identical to that described with reference to FIG. 3 may be used to match a beam mode of the reflected third harmonic laser beam energy (e.g., reflected by curved mirror 910) with a beam mode of the incoming third harmonic laser beam energy.

The radius of curvature and position of curved mirror 360 (e.g., relative to optical energy coupler 314) are selected as described with reference to FIG. 3. Thus, the radius of curvature and position of curved mirror 360 are selected so that a beam radius and a beam divergence of the reflected second harmonic laser beam energy are essentially the same as a beam radius and a beam divergence of the incoming second harmonic laser beam energy everywhere along a beam path of the incoming second harmonic laser beam (e.g., between end mirror 810 and curved mirror 360). In addition, mode-matching optics similar or identical to that described with reference to FIG. 3 may be used to match a beam mode of the reflected second harmonic laser beam energy (e.g., reflected by curved mirror 360) with a beam mode of the incoming second harmonic laser beam energy. Maintaining a substantially uniform beam radius and beam divergence of laser beam 342 helps improve fourth harmonic laser beam energy generation efficiency without affecting a beam mode of the fourth harmonic laser beam energy and without significantly deteriorating a beam quality of the fourth harmonic laser beam energy.

Various embodiments of systems and methods have been described to efficiently generate a higher order harmonic laser beam by recycling a portion of an intermediate harmonic laser beam while maintaining higher order harmonic beam quality. It should be recognized that any higher order harmonic laser beam (e.g., second and higher harmonic laser beams) may be generated using any combination of the intermediate harmonic recycling techniques described herein.

It will be obvious to those having skill in the art that many changes may be made to the details of the above-described embodiments without departing from the underlying principles of the invention. The scope of the present invention should, therefore, be determined only by the following claims.

The invention claimed is:

1. A method of intracavity generation of a second or higher order harmonic laser beam implemented for increased efficiency by recycling a second harmonic laser beam while maintaining beam quality of the higher order harmonic laser beam, comprising:

providing a resonant laser cavity defined by first and second end mirrors and containing a gain medium;

optically pumping the gain medium to generate a fundamental laser beam within the resonant laser cavity, the fundamental laser beam oscillating between the first and second end mirrors;

positioning within the resonant laser cavity a second harmonic nonlinear medium to interact with the fundamental laser beam and thereby generate a second harmonic laser beam;

positioning in optical association with the resonant laser cavity a higher order harmonic nonlinear medium to interact with the second harmonic laser beam and thereby generate a laser beam of higher order than the second order laser beam;

positioning in optical association with the gain medium and the second harmonic nonlinear medium an optical energy coupler that is reflective of the fundamental laser beam and anti-reflective of the second harmonic laser beam, the unreflected second harmonic laser beam exiting the resonant laser cavity through the optical energy coupler as a residual second harmonic laser beam having a beam mode; and setting mode-matching optics in optical association with the optical energy coupler to reflect back into the resonant cavity the residual second harmonic laser beam for intracavity generation of the higher order laser beam, the mode-matching optics being prescribed and positioned relative to the optical energy coupler to establish for the reflected residual second harmonic laser beam a beam mode that substantially matches the beam mode of the residual second harmonic laser beam, thereby to increase higher order harmonic laser beam generation efficiency while maintaining the beam quality of the higher order harmonic laser beam.

2. The method of claim 1, wherein the mode-matching optics comprise a curved mirror having a radius of curvature and a position set relative to the optical energy coupler to establish for the reflected residual second harmonic laser beam a beam mode that substantially matches the beam mode of the residual second harmonic laser beam.

3. The method of claim 1, wherein the mode-matching optics comprise a set of lenses and a curved minor and a radius of curvature of the curved mirror, a position of the curved mirror, a radius of curvature of the set of lenses, and a position of the set of lenses are selected to establish for the reflected residual second harmonic laser beam a beam mode that substantially matches the beam mode of the residual second harmonic laser beam.

4. The method of claim 1, further comprising:
positioning in optical association with the higher order harmonic nonlinear medium a means for coupling the higher order harmonic laser beam out of the resonant laser cavity.

5. The method of claim 1, further comprising:
positioning in optical association with the second harmonic nonlinear medium and the higher order harmonic nonlinear medium an intracavity output coupler that is reflective of the higher order laser beam and anti-reflective of the fundamental laser beam and the second harmonic laser beam, the reflected higher order laser beam exiting the resonant laser cavity through the intracavity output coupler.

6. The method of claim 5, wherein the higher order harmonic nonlinear medium comprises a nonlinear crystal adapted to generate a third harmonic laser beam from at least a portion of the second harmonic laser beam and a portion of the fundamental laser beam and wherein the reflected third harmonic laser beam exits the resonant laser cavity.

7. The method of claim 5, wherein the higher order harmonic nonlinear medium comprises a nonlinear crystal adapted to generate a fourth harmonic laser beam from at least a portion of the second harmonic laser beam and wherein the reflected fourth harmonic laser beam exits the resonant laser cavity.

8. The method of claim 1, wherein the mode-matching optics comprise a first curved mirror, wherein the residual second harmonic laser beam constitutes a first residual second harmonic laser beam, wherein the higher order harmonic nonlinear medium comprises a nonlinear crystal adapted to generate a fourth harmonic laser beam from at least a portion of the second harmonic laser beam, and wherein the second end mirror is reflective of the fundamental laser beam and anti-reflective of the second harmonic laser beam, the second harmonic laser beam exiting the resonant laser cavity as a second residual second harmonic laser beam having a beam mode, and further comprising:
positioning the higher order harmonic nonlinear medium outside of the resonant laser cavity;
positioning in optical association with the higher order harmonic nonlinear medium a second curved mirror that is reflective of the second harmonic laser beam and anti-reflective of the fourth harmonic laser beam, the reflected second harmonic laser beam propagating toward the first curved mirror when reflected by the second curved mirror and the transmitted fourth harmonic laser beam exits a cavity formed by the second curved mirror and the second end mirror; and
selecting a radius of curvature of the second curved mirror and a position of the second curved mirror relative to the second end mirror to establish for the reflected second harmonic laser beam a beam mode that substantially matches the beam mode of the second residual second harmonic laser beam, thereby to increase fourth harmonic laser beam generation efficiency while maintaining the beam quality of the fourth harmonic laser beam.

9. The method of claim 1, wherein the higher order harmonic nonlinear medium comprises a nonlinear crystal adapted to generate a third harmonic laser beam from at least a portion of the second harmonic laser beam and at least a portion of the fundamental laser beam and further comprising:
positioning within the resonant laser cavity a mixing nonlinear medium that is adapted to generate a fourth harmonic laser beam from at least a portion of the fundamental laser beam and at least a portion of the third harmonic laser beam; and
positioning within the resonant laser cavity an intracavity output coupler that is reflective of the fourth harmonic laser beam and anti-reflective of at least the fundamental laser beam and the second harmonic laser beam, the reflected fourth harmonic laser beam exiting the resonant laser cavity through the intracavity output coupler.

10. The method of claim 9, wherein the intracavity output coupler is interposed between the second harmonic nonlinear medium and the mixing nonlinear medium, wherein the mixing nonlinear medium is interposed between the intracavity output coupler and the higher order harmonic nonlinear medium, and wherein the reflected fourth harmonic laser beam exits the resonant laser cavity.

11. The method of claim 9, wherein the intracavity output coupler is anti-reflective of the third harmonic laser beam, wherein the intracavity output coupler is interposed between the higher order harmonic nonlinear medium and the mixing nonlinear medium, wherein the mixing nonlinear medium is interposed between the intracavity output coupler and the second end mirror, and wherein the reflected fourth harmonic laser beam exits the resonant laser cavity.

12. The method of claim 11, wherein the generated third harmonic laser beam is characterized by a beam mode and wherein the mode-matching optics comprise a first curved mirror and further comprising:
positioning in optical association with the second harmonic nonlinear medium and the higher order harmonic nonlinear medium a second curved mirror that is reflective of the third harmonic laser beam and anti-reflective of the fundamental laser beam and the second harmonic laser beam, the reflected third harmonic laser beam propagating toward the second end mirror when reflected by the second curved mirror; and
selecting a radius of curvature of the second curved mirror and a position of the second curved mirror relative to the second end mirror to establish for the reflected third harmonic laser beam a beam mode that substantially matches the beam mode of the generated third harmonic laser beam, thereby to increase fourth harmonic laser beam generation efficiency while maintaining the beam quality of the fourth harmonic laser beam.

13. The method of claim 1, further comprising:
positioning within the resonant laser cavity a Q-switch.

14. The method of claim 1, wherein the mode-matching optics are set out of the resonant laser cavity.

15. The method of claim 1, wherein the step of optically pumping the gain medium comprises:
  positioning between the first end mirror and the gain medium an optical pumping input coupler;
  generating an optical beam with a laser diode pump;
  positioning in optical association with the laser diode pump an optical fiber, the optical fiber configured to aim the optical beam at a lens assembly; and
  positioning in optical association with the optical fiber and the gain medium the lens assembly, the lens assembly configured to focus the optical beam onto the gain medium through the optical pumping input coupler.

16. The method of claim 1, wherein the higher order laser beam is characterized by a beam quality factor ($M^2$) of about 1.2.

17. A harmonic laser, comprising:
  a resonant laser cavity defined by first and second end mirrors;
  a gain medium positioned within the resonant laser cavity and adapted to generate a fundamental laser beam within the resonant laser cavity, the fundamental laser beam oscillating between the first and second end mirrors;
  a second harmonic nonlinear medium positioned within the resonant laser cavity, the second harmonic nonlinear medium adapted to interact with the fundamental laser beam and thereby generate second harmonic laser beam;
  a higher order harmonic nonlinear medium positioned in optical association with the resonant laser cavity, the higher order harmonic nonlinear medium adapted to interact with the second harmonic laser beam and thereby generate a laser beam of higher order than the second order laser beam;
  an optical energy coupler positioned in optical association with the gain medium and the second harmonic nonlinear medium, the optical energy coupler reflective of the fundamental laser beam and anti-reflective of the second harmonic laser beam so that the unreflected second harmonic laser beam exits the resonant laser cavity through the optical energy coupler as a residual second harmonic laser beam having a beam mode; and
  mode-matching optics positioned in optical association with the optical energy coupler to reflect back into the resonant cavity the residual second harmonic laser beam for intracavity generation of the higher order laser beam, the mode-matching optics being prescribed and positioned relative to the optical energy coupler to establish for the reflected residual second harmonic laser beam a beam mode that substantially matches the beam mode of the residual second harmonic laser beam, thereby to increase higher order harmonic laser beam generation efficiency while maintaining a beam quality of the higher order harmonic laser beam.

18. The laser of claim 17, wherein the mode-matching optics comprise a curved mirror having a radius of curvature and a position set relative to the optical energy coupler to establish for the reflected residual second harmonic laser beam a beam mode that substantially matches the beam mode of the residual second harmonic laser beam.

19. The laser of claim 17, wherein the mode-matching optics comprise a set of lenses and a curved mirror and a radius of curvature of the curved mirror, a position of the curved mirror, a radius of curvature of the set of lenses, and a position of the set of lenses are selected to establish for the reflected residual second harmonic laser beam a beam mode that substantially matches the beam mode of the residual second harmonic laser beam.

20. The laser of claim 17, further comprising:
  an intracavity output coupler positioned in optical association with the second harmonic nonlinear medium and the higher order harmonic nonlinear medium, the intracavity output coupler adapted to be reflective of the higher order laser beam and anti-reflective of the fundamental laser beam and the second harmonic laser beam so that the reflected higher order laser beam exits the resonant laser cavity through the intracavity output coupler.

21. The laser of claim 20, wherein the higher order harmonic nonlinear medium comprises a nonlinear crystal adapted to generate a third harmonic laser beam from at least a portion of the second harmonic laser beam and at least a portion of the fundamental laser beam and wherein the reflected third harmonic laser beam exits the resonant laser cavity.

22. The laser of claim 17, wherein the mode-matching optics comprise a first curved mirror, wherein the residual second harmonic laser beam constitutes a first residual second harmonic laser beam, wherein the higher order harmonic nonlinear medium comprises a nonlinear crystal adapted to generate a fourth harmonic laser beam from at least a portion of the second harmonic laser beam, wherein the higher order harmonic nonlinear medium is positioned outside of the resonant laser cavity, and wherein the second end mirror is reflective of the fundamental laser beam and anti-reflective of the second harmonic laser beam, the second harmonic laser beam exiting the resonant laser cavity as a second residual second harmonic laser beam having a beam mode, and further comprising:
  a second curved mirror positioned in optical association with the higher order harmonic nonlinear medium, the second curved mirror adapted to be reflective of the second harmonic laser beam and anti-reflective of the fourth harmonic laser beam so that the reflected second harmonic laser beam propagates toward the first curved mirror when reflected by the second curved mirror and the transmitted fourth harmonic laser beam exits a cavity formed by the second curved mirror and the second end mirror, the second curved mirror having a radius of curvature and a position relative to the second end mirror selected to establish for the reflected second harmonic laser beam a beam mode that substantially matches the beam mode of the second residual second harmonic laser beam, thereby to increase fourth harmonic laser beam generation efficiency while maintaining a beam quality of the fourth harmonic laser beam.

23. The laser of claim 17, wherein the higher order harmonic nonlinear medium comprises a nonlinear crystal adapted to generate a third harmonic laser beam from at least a portion of the second harmonic laser beam and at least a portion of the fundamental laser beam and further comprising:
  a mixing nonlinear medium positioned within the resonant laser cavity, the mixing nonlinear medium adapted to generate a fourth harmonic laser beam from at least a portion of the fundamental laser beam and at least a portion of the third harmonic laser beam; and
  an intracavity output coupler positioned within the resonant laser cavity, the intracavity output coupler adapted to be reflective of the fourth harmonic laser beam and anti-reflective of at least the fundamental laser beam and the second harmonic laser beam so that the reflected fourth harmonic laser beam exits the resonant laser cavity through the intracavity output coupler.

24. The laser of claim 23, wherein the intracavity output coupler is anti-reflective of the third harmonic laser beam, wherein the intracavity output coupler is interposed between the higher order harmonic nonlinear medium and the mixing nonlinear medium, wherein the mixing nonlinear medium is interposed between the intracavity output coupler and the second end mirror, and wherein the reflected fourth harmonic laser beam exits the resonant laser cavity.

25. The laser of claim 24, wherein the generated third harmonic laser beam is characterized by a beam mode and wherein the mode-matching optics comprise a first curved mirror and further comprising:

a second curved mirror positioned in optical association with the second harmonic nonlinear medium and the higher order harmonic nonlinear medium, the second curved mirror adapted to be reflective of the third harmonic laser beam and anti-reflective of the fundamental laser beam and the second harmonic laser beam so that the reflected third harmonic laser beam propagates toward the second end mirror when reflected by the second curved mirror, the second curved mirror having a radius of curvature and a position relative to the second end mirror selected to establish for the reflected third harmonic laser beam a beam mode that substantially matches the beam mode of the generated third harmonic laser beam, thereby to increase fourth harmonic laser beam generation efficiency while maintaining a beam quality of the fourth harmonic laser beam.

* * * * *